(12) United States Patent
Teramura et al.

(10) Patent No.: US 10,761,450 B2
(45) Date of Patent: Sep. 1, 2020

(54) OPTICAL SCANNING APPARATUS AND IMAGE FORMING APPARATUS

(71) Applicant: CANON KABUSHIKI KAISHA, Tokyo (JP)

(72) Inventors: Masayasu Teramura, Utsunomiya (JP); Yu Miyajima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/539,462

(22) Filed: Aug. 13, 2019

(65) Prior Publication Data

US 2020/0057402 A1 Feb. 20, 2020

(30) Foreign Application Priority Data

Aug. 20, 2018 (JP) ................... 2018-154096

(51) Int. Cl.
G03G 15/04 (2006.01)
G02B 26/12 (2006.01)

(52) U.S. Cl.
CPC ..... G03G 15/04036 (2013.01); G02B 26/125 (2013.01)

(58) Field of Classification Search
USPC .......................................................... 399/4
See application file for complete search history.

(56) References Cited

U.S. PATENT DOCUMENTS

| 9,217,863 | B2 | 12/2015 | Teramura |
| 9,575,431 | B2 | 2/2017 | Teramura |
| 10,012,938 | B2 | 7/2018 | Miyajima |
| 10,054,790 | B2 | 8/2018 | Sumida et al. |
| 2014/0160216 | A1* | 6/2014 | Kimura ............. G03G 15/0435 347/118 |
| 2016/0202393 | A1 | 7/2016 | Saiga et al. |
| 2018/0329348 | A1 | 11/2018 | Miyajima |
| 2019/0163083 | A1 | 5/2019 | Miyajima |
| 2019/0286007 | A1 | 9/2019 | Teramura |

FOREIGN PATENT DOCUMENTS

| JP | 2004102050 A | 4/2004 |
| JP | 2007025536 A | 2/2007 |
| JP | 2008020473 A | 1/2008 |

* cited by examiner

*Primary Examiner* — Quana Grainger
(74) *Attorney, Agent, or Firm* — Carter, DeLuca & Farrell LLP

(57) ABSTRACT

The optical scanning apparatus includes a deflecting unit that scans first and second (FaS) scanned surfaces in main scanning direction by deflecting FaS light fluxes incident on a first deflecting surface at different angles with respect to main scanning section in sub-scanning section, and a first optical element including FaS optical portions which guide FaS light fluxes deflected by deflecting unit to FaS scanned surfaces, respectively. An incident surface of first optical element projects most toward deflecting unit at a position of surface vertex on the incident surface in sub-scanning section including the surface vertex. At least one of FaS exit surfaces of FaS optical portions is a sagittal tilt surface. A distance between surface vertices on FaS exit surfaces in sub-scanning section including an incident position of axial ray is larger than the corresponding distance in sub-scanning section including an incident position of outermost off-axis ray.

18 Claims, 11 Drawing Sheets

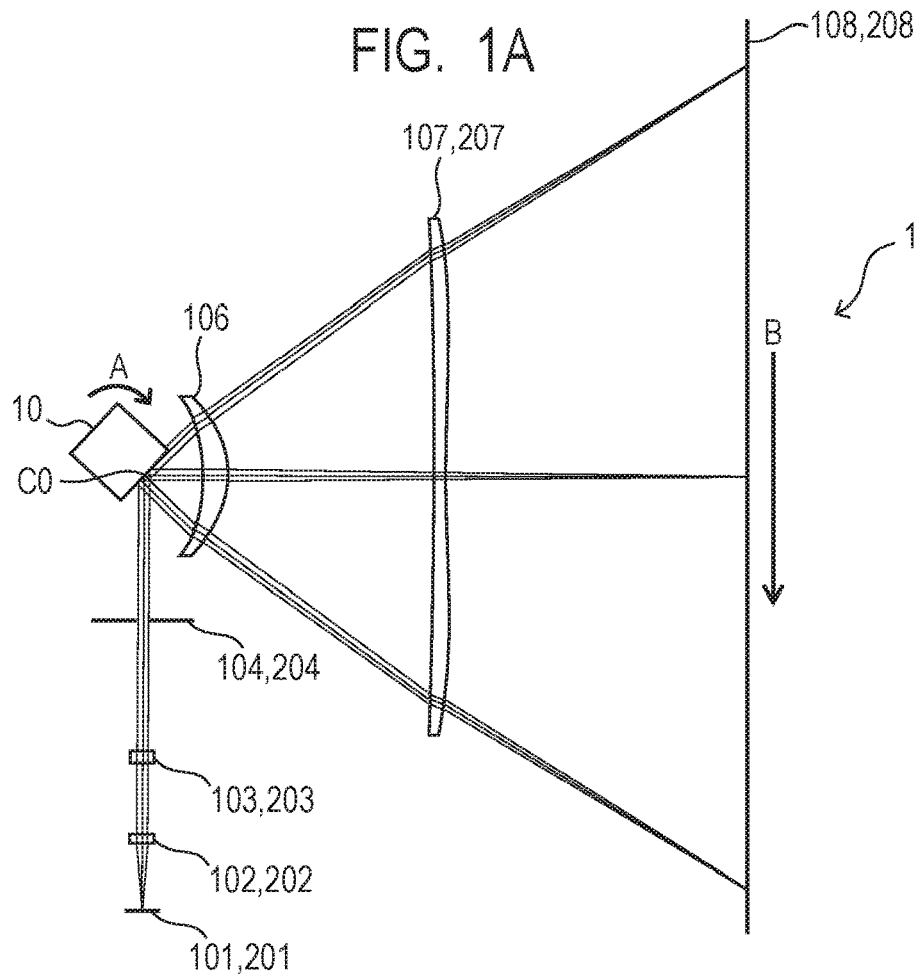
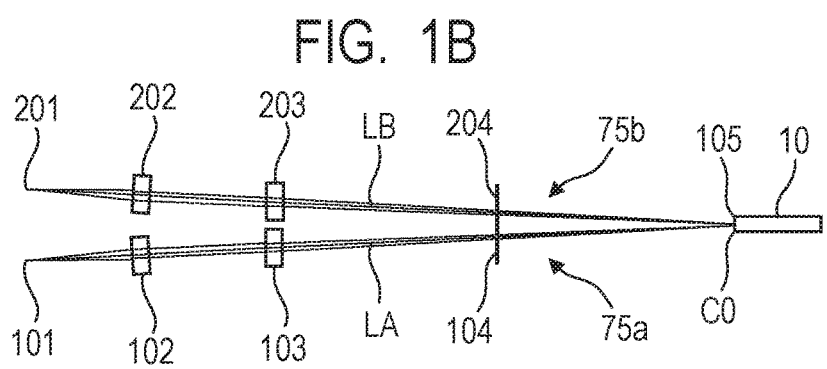
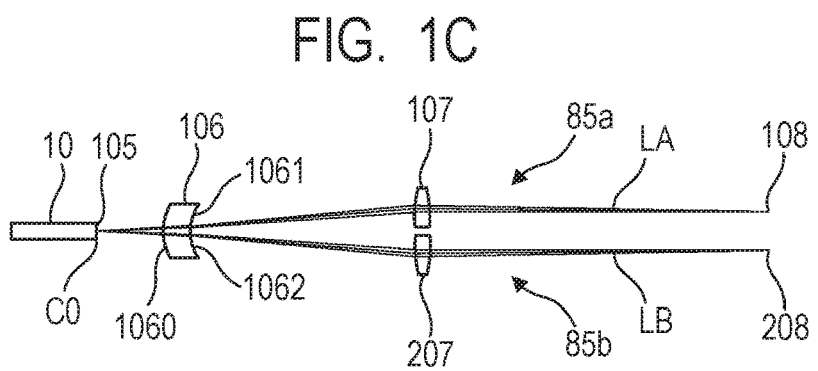

901

FIG. 10
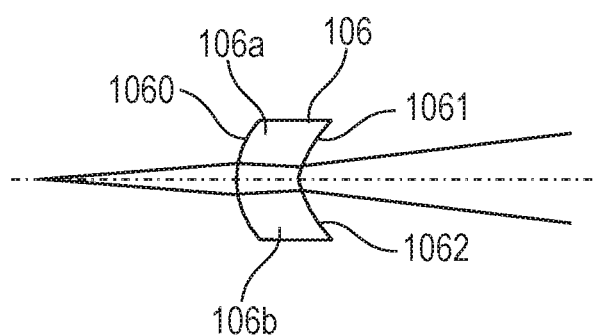
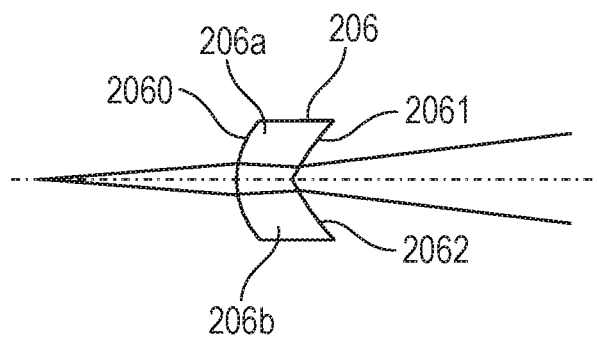

OPTICAL SCANNING APPARATUS AND IMAGE FORMING APPARATUS

BACKGROUND OF THE INVENTION

Field of the Invention

The present invention relates to an optical scanning apparatus, which is especially suitable for an image forming apparatus such as a laser beam printer (LBP), a digital copier, and a multifunction printer (MFP).

Description of the Related Art

Small optical scanning apparatuses have been developed in recent years in order to achieve reduction in size of color image forming apparatuses.

However, such reduction in the size of the optical scanning apparatus leads to reduction in space inside the optical scanning apparatus, thus complicating arrangement of optical elements therein so as to avoid interferences with one another.

Japanese Patent Application Laid-Open No. 2004-102050 discloses an optical scanning apparatus including fθ lenses with sagittal tilt surfaces, in which a plurality of light fluxes are obliquely incident on a deflecting unit at angles different from one another in a sub-scanning section and the light fluxes deflected by the deflecting unit are refracted by the fθ lenses to spread intervals between the light fluxes. According to this apparatus, it is possible to achieve reduction in size of the apparatus as a whole by adopting the configuration to deflect the plurality of light fluxes with the shared deflecting unit, and to ensure a sufficient space for arranging optical elements located downstream of the fθ lenses so as to avoid interfere with one another.

However, in the optical scanning apparatus disclosed in Japanese Patent Application Laid-Open No. 2004-102050, the light fluxes are obliquely incident on the deflecting unit. As a consequence, loci (scanning lines) on each optical element formed by the light fluxes deflected by the deflecting unit are curved in a sub-scanning direction. Accordingly, this apparatus has a difficulty in reducing the size in the sub-scanning direction of each optical element.

Given the situation, it is an object of the present invention to provide an optical scanning apparatus which is capable of achieving further reduction in size by reducing amounts of curve of scanning lines in a sub-scanning direction.

SUMMARY OF THE INVENTION

An optical scanning apparatus according to the present invention includes a deflecting unit configured to scan first and second scanned surfaces in a main scanning direction by deflecting first and second light fluxes incident on a first deflecting surface at different angles with respect to a main scanning section in a sub-scanning section; and a first optical element including first and second optical portions which are configured to guide the first and second light fluxes deflected by the deflecting unit to the first and second scanned surfaces, respectively. An incident surface of the first optical element projects most toward the deflecting unit at a position of a surface vertex on the incident surface in a sub-scanning section including the surface vertex. At least one of a first exit surface of the first optical portion and a second exit surface of the second optical portion is a sagittal tilt surface. A distance between a surface vertex on the first exit surface and a surface vertex on the second exit surface in a sub-scanning section including an incident position of an axial ray is larger than a distance between a surface vertex on the first exit surface and a surface vertex on the second exit surface in a sub-scanning section including an incident position of an outermost off-axis ray.

Further features of the present invention will become apparent from the following description of exemplary embodiments with reference to the attached drawings.

BRIEF DESCRIPTION OF THE DRAWINGS

FIG. 1A is a development diagram in a main scanning section of an optical scanning apparatus according to a first embodiment.

FIG. 1B is a development diagram in a sub-scanning section of incident optical systems included in the optical scanning apparatus according to the first embodiment.

FIG. 1C is a development diagram in the sub-scanning section of scanning optical systems included in the optical scanning apparatus according to the first embodiment.

FIG. 10 shows sub-scanning sectional views of first fθ lenses included in the optical scanning apparatus according to the second embodiment.

DESCRIPTION OF THE EMBODIMENTS

Optical scanning apparatuses according to embodiments of the present invention will be described below in detail with reference to the accompanying drawings. Note that the drawings shown below may be illustrated with dimensions that are different from actual those in order to facilitate the understanding of the embodiments.

In the following description, a main scanning direction is a direction perpendicular to a rotation axis of a deflecting unit and to an optical axis of an optical system. A sub-scanning direction is a direction parallel to the rotation axis of the deflecting unit. A main scanning section is a cross-section perpendicular to the sub-scanning direction. A sub-scanning section is a cross-section perpendicular to the main scanning direction.

Therefore, it is to be noted that the main scanning direction and the sub-scanning section in an incident optical system are different from those in an imaging optical system in the following description.

First Embodiment

Figure 2:
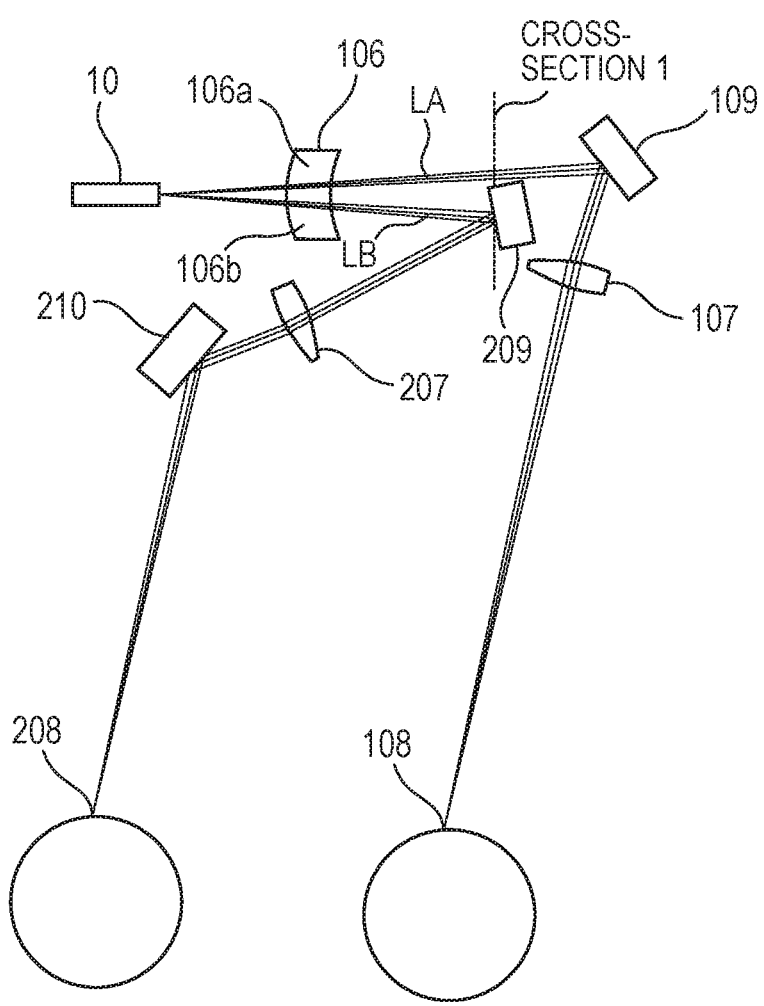
FIG. 2 is a sub-scanning sectional view of the scanning optical systems included in the optical scanning apparatus according to the first embodiment.

FIG. 1A shows a development diagram in a main scanning section of an optical scanning apparatus 1 according to a first embodiment. FIGS. 1B and 1C show development diagrams in a sub-scanning section of incident optical systems and scanning optical systems included in the optical scanning apparatus 1 according to the first embodiment, respectively. FIG. 2 shows a sub-scanning sectional view of the scanning optical systems included in the optical scanning apparatus 1 according to the first embodiment.

The optical scanning apparatus 1 of this embodiment includes first and second light sources 101 and 201, first and second collimator lenses 102 and 202, first and second cylindrical lenses 103 and 203, and first and second aperture stops 104 and 204.

Moreover, the optical scanning apparatus 1 of this embodiment includes a deflecting unit 10, a first fθ lens 106 (first optical element), second fθ lenses 107 and 207, and reflecting members 109, 209 and 210.

Semiconductor laser or the like is used for each of the first and second light sources 101 and 201.

The first and second collimator lenses 102 and 202 convert light fluxes LA and LB (first and second light fluxes) emitted from the first and second light sources 101 and 201 into parallel light fluxes. Here, the parallel light fluxes include not only strictly parallel light fluxes but also substantially parallel light fluxes such as weak divergent light fluxes and weak convergent light fluxes.

Each of the first and second cylindrical lenses 103 and 203 has a finite power (a refractive power) in a sub-scanning section. The light fluxes LA and LB passed through the first and second collimator lenses 102 and 202 are condensed in the sub-scanning direction with the first and second cylindrical lenses 103 and 203.

The first and second aperture stops 104 and 204 limit light flux diameters of the light fluxes LA and LB passed through the first and second cylindrical lenses 103 and 203.

Thus, the light fluxes LA and LB emitted from the first and second light sources 101 and 201 are condensed only in the sub-scanning direction in the vicinity of a deflecting surface 105 of the deflecting unit 10, and are formed into linear images each being long in the main scanning direction.

The deflecting unit 10 is rotated in a direction of an arrow A in FIG. 1A by a not-illustrated driving unit such as a motor, thus deflecting the light fluxes LA and LB incident on the deflecting unit 10. Here, the deflecting unit 10 is formed from a polygon mirror, for example.

Each of the first fθ lens 106 and the second fθ lenses 107 and 207 is an anamorphic imaging lens having different powers in the main scanning section and in the sub-scanning section. Moreover, each of the first fθ lens 106 and the second fθ lenses 107 and 207 is configured to condense (guide) the light fluxes LA and LB deflected by the deflecting surface 105 of the deflecting unit 10 onto first and second scanned surfaces 108 and 208.

Here, the first fθ lens 106 is a multi-stage lens in which a first optical portion 106a and a second optical portion 106b are arranged side by side in the sub-scanning direction. Specifically, an incident surface of the first fθ lens 106 is formed from an incident surface of the first optical portion 106a and an incident surface of the second optical portion 106b, while an exit surface of the first fθ lens 106 is formed from an exit surface of the first optical portion 106a (a first exit surface) and an exit surface of the second optical portion 106b (a second exit surface). Moreover, the exit surfaces of the first optical portion 106a and the second optical portion 106b are sagittal tilt variable surfaces having shapes with amounts of sagittal tilt different from each other, and each of the amounts of sagittal tilt varies in the main scanning direction.

The reflecting members 109, 209, and 210 are units for reflecting the light fluxes, which employ deposited mirrors and the like.

In the optical scanning apparatus 1 of this embodiment, a first incident optical system 75a is formed from the first collimator lens 102, the first cylindrical lens 103, and the first aperture stop 104. Moreover, a second incident optical system 75b is formed from the second collimator lens 202, the second cylindrical lens 203, and the second aperture stop 204.

In the meantime, in the optical scanning apparatus 1 of this embodiment, a first scanning optical system 85a is formed from the first optical portion 106a of the first fθ lens 106 and the second fθ lens 107. Moreover, a second scanning optical system 85b is formed from the second optical portion 106b of the first fθ lens 106 and the second fθ lens 207.

In the meantime, in the optical scanning apparatus 1 of this embodiment, a first reflecting optical system 95a is formed from the reflecting member 109 and a second reflecting optical system 95b is formed from the reflecting members 209 and 210.

Incidentally, in the optical scanning apparatus 1 of this embodiment, optical axes of the first and second incident optical systems 75a and 75b form angles of +3.0 degrees and −3.0 degrees, respectively, in the sub-scanning section with respect to the main scanning section.

Note that an expression "angles different from each other" in this embodiment also include such angles having the same absolute value but with opposite signs to each other.

The light flux LA emitted from a light emitting point of the first light source 101 is converted into the parallel light flux by the first collimator lens 102.

Then, the converted light flux LA is condensed in the sub-scanning direction by the first cylindrical lens 103, passed through the first aperture stop 104, and is incident on the deflecting surface 105 of the deflecting unit 10 from a lower side in the sub-scanning direction.

Thereafter, the light flux LA emitted from the first light source 101 and incident on the deflecting surface 105 of the deflecting unit 10 is deflected by the deflecting unit 10 and is then condensed on the first scanned surface 108 with the first scanning optical system 85a, thus scanning the first scanned surface 108 at a uniform velocity.

The light flux LB emitted from a light emitting point of the second light source 201 is converted into the parallel light flux by the second collimator lens 202.

Then, the converted light flux LB is condensed in the sub-scanning direction by the second cylindrical lens 203, passed through the second aperture stop 204, and is incident on the deflecting surface 105 of the deflecting unit 10 from an upper side in the sub-scanning direction.

The light flux LB emitted from the second light source 201 and incident on the deflecting surface 105 of the deflecting unit 10 is deflected by the deflecting unit 10 and is then condensed on the second scanned surface 208 with the second scanning optical system 85b, thus scanning the second scanned surface 208 at a uniform velocity.

Here, the deflecting unit 10 is rotated in the direction A in FIG. 1A. Accordingly, the deflected light fluxes LA and LB scan the first and second scanned surfaces 108 and 208 in a direction B in FIG. 1A, respectively.

Meanwhile, reference numeral C0 denotes a deflection point (an axial deflection point) on the deflecting surface 105 of the deflecting unit 10 relative to a principal ray of an axial flux. In terms of the sub-scanning direction, the light fluxes LA and LB emitted from the first and second light sources 101 and 201 cross each other at the deflection point C0. In the meantime, the deflection point C0 serves as a reference point of the first and second scanning optical systems 85a and 85b.

Note that first and second photosensitive drums 108 and 208 are used as the first and second scanned surfaces 108 and 208 in this embodiment.

Meanwhile, formation of exposure distribution in the sub-scanning direction on the first and second photosensitive drums 108 and 208 is achieved by rotating the first and second photosensitive drums 108 and 208 in the sub-scanning direction in each session of main scanning exposure.

Next, characteristics of the first and second incident optical systems 75a and 75b and the first and second scanning optical systems 85a and 85b of the optical scanning apparatus 1 of this embodiment will be listed in the following Tables 1 to 3.

TABLE 1

| characteristics of light sources 101 and 201 | | |
|---|---|---|
| number of light emitting points | N (points) | 2 |
| rotation angles of light sources 101 and 201 | (deg) | −6.54 |
| array | (dimensions) | 1 |
| pitch | pitch (mm) | 0.09 |
| wavelength | $\lambda$ (nm) | 790 |
| incident polarization to deflecting surface 105 of deflecting unit 10 | | p polarization |
| full angle at half maximum in main scanning direction | FFPy (deg) | 12.00 |
| full angle at half maximum in sub-scanning direction | FFPz (deg) | 30.00 |

| forms of stops | | |
|---|---|---|
| | main scanning direction | sub-scanning direction |
| aperture stops 104 and 204 | 3.050 | 0.782 |

| refractive indices | | |
|---|---|---|
| collimator lenses 102 and 202 | N1 | 1.762 |
| cylindrical lenses 103 and 203 | N2 | 1.524 |

| forms of optical elements | | | |
|---|---|---|---|
| | | main scanning direction | sub-scanning direction |
| curvature radius of incident surfaces of collimator lenses 102 and 202 | r1a (mm) | ∞ | ∞ |
| curvature radius of exit surfaces of collimator lenses 102 and 202 | r1b (mm) | −15.216 | −15.216 |
| curvature radius of incident surfaces of cylindrical lenses 103 and 203 | r2a (mm) | ∞ | 41.028 |
| curvature radius of exit surfaces of cylindrical lenses 103 and 203 | r2b (mm) | ∞ | ∞ |

TABLE 1-continued

| focal lengths | | | |
|---|---|---|---|
| | | main scanning direction | sub-scanning direction |
| collimator lenses 102 and 202 | fcol (mm) | 19.98 | 19.98 |
| cylindrical lenses 103 and 203 | fcyl (mm) | ∞ | 78.30 |
| arrangement | | | |
| light sources 101 and 201 to collimator lenses 102 and 202 | d0 (mm) | 18.31 | |
| incident surfaces of collimator lenses 102 and 202 to exit surfaces of collimator lenses 102 and 202 | d1 (mm) | 3.00 | |
| exit surfaces of collimator lenses 102 and 202 to incident surfaces of cylindrical lenses 103 and 203 | d2 (mm) | 19.77 | |
| incident surfaces of cylindrical lenses 103 and 203 to exit surfaces of cylindrical lenses 103 and 203 | d3 (mm) | 3.00 | |
| exit surfaces of cylindrical lenses 103 and 203 to aperture stops 104 and 204 | d4 (mm) | 36.71 | |
| aperture stops 104 and 204 to deflecting surface 105 of deflecting unit 10 | d5 (mm) | 40.33 | |
| angle of incidence in main scanning section of light exiting from aperture stop 104 into deflecting surface 105 | A1 (deg) | 90.00 | |
| angle of incidence in main scanning section of light exiting from aperture stop 204 into deflecting surface 105 | A2 (deg) | 90.00 | |
| angle of incidence in sub-scanning section of light exiting from aperture stop 104 into deflecting surface 105 | A3 (deg) | 3.00 | |
| angle of incidence in sub-scanning section of light exiting from aperture stop 204 into deflecting surface 105 | A4 (deg) | −3.00 | |

TABLE 2

| fθ coefficient, scanning width, and angle of view | | |
|---|---|---|
| fθ coefficient | k (mm/rad) | 146 |
| scanning width | W (mm) | 230 |
| maximum angle of view | θ (deg) | 45.1 |
| refractive indices | | |
| refractive index of first optical portion 106a | N5 | 1.524 |
| refractive index of second fθ lens 107 | N6 | 1.524 |
| deflecting unit | | |
| number of deflecting surfaces | | 4 |
| circumradius | Rpol (mm) | 10 |
| rotation center to deflection point C0 (optical axis direction) | Xpol (mm) | 5.74 |
| rotation center to deflection point C0 (main scanning direction) | Ypol (mm) | 4.26 |
| arrangement of first scanning optical system 85a | | |
| deflection point C0 to incident surface of first optical portion 106a | d12 (mm) | 17.00 |
| incident surface of first optical portion 106a to exit surface of first optical portion 106a | d13 (mm) | 6.70 |
| exit surface of first optical portion 106a to incident surface of second fθ lens 107 | d14 (mm) | 56.30 |
| incident surface of second fθ lens 107 to exit surface of second fθ lens 107 | d15 (mm) | 3.50 |
| exit surface of second fθ lens 107 to first scanned surface 108 | d16 (mm) | 84.50 |
| deflection point C0 to incident surface of second fθ lens 107 | L1 (mm) | 80.00 |
| deflection point C0 to first scanned surface 108 | T1 (mm) | 168.00 |
| amount of sub-scanning eccentricity of second fθ lens 107 | shiftZ (mm) | 5.67 |

TABLE 2-continued

| shape of meridional line of first optical portion 106a | | |
|---|---|---|
| | incident surface counter-light source side | exit surface counter-light source side |
| R | −39.866 | −28.253 |
| ku | 2.065E+00 | 8.659E+05 |
| B4u | 9.292E−06 | −1.398E−05 |
| B6u | 3.110E−08 | 2.362E−08 |
| B8u | −1.025E−10 | −2.189E−11 |
| B10u | 1.310E−13 | −2.171E−14 |
| B12u | 0 | 0 |
| | light source side | light source side |
| kl | 2.065E+00 | 8.659E+05 |
| B4l | 9.292E−06 | −1.412E−05 |
| B6l | 3.110E−08 | 2.454E−08 |
| B8l | −1.025E−10 | −2.394E−11 |
| B10l | 1.310E−13 | −1.979E−14 |
| B12l | 0 | 0 |
| shape of sagittal line of first optical portion 106a | | |
| | incident surface change in sagittal radius | exit surface change in sagittal radius |
| r | 13.000 | 11.268 |
| E1 | 0 | 1.455E−04 |
| E2 | 0 | −1.686E−04 |
| E3 | 0 | 0 |
| E4 | 0 | −4.846E−07 |
| E5 | 0 | 0 |
| E6 | 0 | 1.156E−09 |
| E7 | 0 | 0 |

TABLE 2-continued

| | | |
|---|---|---|
| E8 | 0 | 0 |
| E9 | 0 | 0 |
| E10 | 0 | 0 |

| | sagittal tilt | sagittal tilt |
|---|---|---|
| M0_1 | 0 | 3.845E−02 |
| M1_1 | 0 | −9.266E−06 |
| M2_1 | 0 | −8.686E−05 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 | shape of meridional line of second fθ lens 107

| | incident surface counter-light source side | exit surface counter-light source side |
|---|---|---|
| R | −10000 | 228.410 |
| ku | 0 | −5.462E+01 |
| B4u | 0 | −5.399E−07 |
| B6u | 0 | 1.054E−10 |
| B8u | 0 | −1.701E−14 |
| B10u | 0 | 1.722E−18 |
| B12u | 0 | −7.826E−23 |

| | light source side | light source side |
|---|---|---|
| kl | 0 | −5.462E+01 |
| B4l | 0 | −5.411E−07 |
| B6l | 0 | 1.067E−10 |
| B8l | 0 | −1.777E−14 |
| B10l | 0 | 1.890E−18 |
| B12l | 0 | −9.085E−23 | shape of sagittal line of second fθ lens 107

| | incident surface change in sagittal radius | exit surface change in sagittal radius |
|---|---|---|
| r | 60.676 | −31.725 |
| E1 | 0 | 2.169E−04 |
| E2 | 4.470E−04 | 3.483E−05 |
| E3 | 0 | 0 |
| E4 | −4.827E−08 | 5.550E−09 |
| E5 | 0 | 0 |
| E6 | −2.372E−12 | −3.405E−12 |
| E7 | 0 | 0 |
| E8 | 2.304E−15 | 2.138E−16 |
| E9 | 0 | 0 |
| E10 | 0 | 0 |

| | sagittal tilt | sagittal tilt |
|---|---|---|
| M0_1 | 9.462E−02 | −8.550E−02 |
| M1_1 | 3.547E−04 | 3.581E−04 |
| M2_1 | 2.849E−06 | 3.393E−05 |
| M3_1 | −5.463E−08 | −7.297E−08 |
| M4_1 | 1.278E−09 | −9.985E−09 |
| M5_1 | 2.873E−12 | 1.851E−11 |
| M6_1 | −1.077E−12 | 2.695E−12 |
| M7_1 | 2.305E−15 | −1.912E−15 |
| M8_1 | −2.333E−16 | −7.635E−16 |
| M9_1 | −1.496E−19 | 2.569E−19 |
| M10_1 | 2.586E−20 | 4.568E−20 |
| M11_1 | 0 | 0 |
| M12_1 | 0 | 0 |

TABLE 3

| fθ coefficient, scanning width, and angle of view | | |
|---|---|---|
| fθ coefficient | k (mm/rad) | 146 |
| scanning width | W (mm) | 230 |
| maximum angle of view | θ (deg) | 45.1 |
| refractive indices | | |
| refractive index of second optical portion 106b | N5 | 1.524 |
| refractive index of second fθ lens 207 | N6 | 1.524 |
| deflecting unit | | |
| number of deflecting surfaces | | 4 |
| circumradius | Rpol (mm) | 10 |
| rotation center to deflection point C0 (optical axis direction) | Xpol (mm) | 5.74 |
| rotation center to deflection point C0 (main scanning direction) | Ypol (mm) | 4.26 |
| arrangement of second scanning optical system 85b | | |
| deflection point C0 to incident surface of second optical portion 106b | d12 (mm) | 17.00 |
| incident surface of second optical portion 106b to exit surface of second optical portion 106b | d13 (mm) | 6.70 |
| exit surface of second optical portion 106b to incident surface of second fθ lens 207 | d14 (mm) | 56.30 |
| incident surface of second fθ lens 207 to exit surface of second fθ lens 207 | d15 (mm) | 3.50 |
| exit surface of second fθ lens 207 to second scanned surface 208 | d16 (mm) | 84.50 |
| deflection point C0 to incident surface of second fθ lens 207 | L1 (mm) | 80.00 |
| deflection point C0 to second scanned surface 208 | T1 (mm) | 168.00 |
| amount of sub-scanning eccentricity of second fθ lens 207 | shiftZ (mm) | 5.67 | shape of meridional line of second optical portion 106b

| | incident surface counter-light source side | exit surface counter-light source side |
|---|---|---|
| R | −39.866 | −28.253 |
| ku | 2.065E+00 | 8.659E+05 |
| B4u | 9.292E−06 | −1.398E−05 |
| B6u | 3.110E−08 | 2.362E−08 |
| B8u | −1.025E−10 | −2.189E−11 |
| B10u | 1.310E−13 | −2.171E−14 |
| B12u | 0 | 0 |

| | light source side | light source side |
|---|---|---|
| kl | 2.065E+00 | 8.659E+05 |
| B4l | 9.292E−06 | −1.412E−05 |
| B6l | 3.110E−08 | 2.454E−08 |
| B8l | −1.025E−10 | −2.394E−11 |
| B10l | 1.310E−13 | −1.979E−14 |
| B12l | 0 | 0 | shape of sagittal line of second optical portion 106b

| | incident surface change in sagittal radius | exit surface change in sagittal radius |
|---|---|---|
| r | 13.000 | 11.268 |
| E1 | 0 | 1.455E−04 |
| E2 | 0 | −1.686E−04 |
| E3 | 0 | 0 |
| E4 | 0 | −4.846E−07 |
| E5 | 0 | 0 |
| E6 | 0 | 1.156E−09 |
| E7 | 0 | 0 |
| E8 | 0 | 0 |
| E9 | 0 | 0 |
| E10 | 0 | 0 |

TABLE 3-continued

| | sagittal tilt | sagittal tilt |
|---|---|---|
| M0_1 | 0 | −3.845E−02 |
| M1_1 | 0 | 9.266E−06 |
| M2_1 | 0 | 8.686E−05 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 | shape of meridional line of second fθ lens 207

| | incident surface counter-light source side | exit surface counter-light source side |
|---|---|---|
| R | −10000 | 228.410 |
| ku | 0 | −5.462E+01 |
| B4u | 0 | −5.399E−07 |
| B6u | 0 | 1.054E−10 |
| B8u | 0 | −1.701E−14 |
| B10u | 0 | 1.722E−18 |
| B12u | 0 | −7.826E−23 |

| | light source side | light source side |
|---|---|---|
| kl | 0 | −5.462E+01 |
| B4l | 0 | −5.411E−07 |
| B6l | 0 | 1.067E−10 |
| B8l | 0 | −1.777E−14 |
| B10l | 0 | 1.890E−18 |
| B12l | 0 | −9.085E−23 | shape of sagittal line of second fθ lens 207

| | incident surface change in sagittal radius | exit surface change in sagittal radius |
|---|---|---|
| r | 60.676 | −31.725 |
| E1 | 0 | 2.169E−04 |
| E2 | 4.470E−04 | 3.483E−05 |
| E3 | 0 | 0 |
| E4 | −4.827E−08 | 5.550E−09 |
| E5 | 0 | 0 |
| E6 | −2.372E−12 | −3.405E−12 |
| E7 | 0 | 0 |
| E8 | 2.304E−15 | 2.138E−16 |
| E9 | 0 | 0 |
| E10 | 0 | 0 |

| | sagittal tilt | sagittal tilt |
|---|---|---|
| M0_1 | −9.462E−02 | 8.550E−02 |
| M1_1 | −3.547E−04 | −3.581E−04 |
| M2_1 | −2.849E−06 | −3.393E−05 |
| M3_1 | 5.463E−08 | 7.297E−08 |
| M4_1 | −1.278E−09 | 9.985E−09 |
| M5_1 | −2.873E−12 | −1.851E−11 |
| M6_1 | 1.077E−12 | −2.695E−12 |
| M7_1 | −2.305E−15 | 1.912E−15 |
| M8_1 | 2.333E−16 | 7.635E−16 |
| M9_1 | 1.496E−19 | −2.569E−19 |
| M10_1 | −2.586E−20 | −4.568E−20 |
| M11_1 | 0 | 0 |
| M12_1 | 0 | 0 |

Note that in Tables 1 to 3, a direction of an optical axis, an axis orthogonal to the optical axis in the main scanning section, and an axis orthogonal to the optical axis in the sub-scanning section in the case where an intersection point of each lens surface and the optical axis is defined as a point of origin are defined as an x axis, a y axis, and a z axis, respectively. In addition, in Tables 2 and 3, an expression "E-x" means "×10$^{-x}$".

An aspheric surface shape (a meridional shape) in the main scanning section of each of lens surfaces of the first and second optical portions 106a and 106b of the first fθ lens 106 and the second fθ lenses 107 and 207 of the optical scanning apparatus 1 of this embodiment is defined by the following expression (1):

$$x = \frac{y^2/R}{1+(1-(1+k)(y/R)^2)^{1/2}} + \sum_{i=4}^{12} B_i y^i, \quad (1)$$

where R is a curvature radius, k is an eccentricity, and $B_i$ (i=4, 6, 8, 10, 12) is an aspheric coefficient. Here, when the coefficients $B_i$ on a positive side and a negative side vary concerning y, then an index u is added to the coefficient on the positive side (namely, $B_{iu}$) while an index l is added to the coefficient on the negative side (namely, $B_{il}$).

Meanwhile, an aspheric surface shape (a sagittal shape) in the sub-scanning section of each of the lens surfaces of the first and second optical portions 106a and 106b of the first fθ lens 106 and the second fθ lenses 107 and 207 is defined by the following expression (2):

$$S = \frac{z^2/r'}{1+(1-(z/r')^2)^{1/2}} + \sum_{j=0}^{12}\sum_{k=1}^{1} M_{jk} Y^j Z^k, \quad (2)$$

where $M_{jk}$ (j=0 to 12, and k=1) is an aspheric coefficient.

Note that the amount of sagittal tilt in this embodiment corresponds to a value $M_{01}$. Accordingly, the sagittal tilt surface represents a surface having the value of $M_{01}$ not equal to 0, and the sagittal tilt variable surface represents a surface having at least one of values $M_{j1}$ (j=1 to 12) not equal to 0.

In the meantime, a curvature radius r' in the sub-scanning section continuously varies in accordance with the y coordinate of the lens surface as defined in the following expression (3):

$$r' = r\left(1 + \sum_{j=1}^{10} E_j y^j\right), \quad (3)$$

where r is a curvature radius on the optical axis and $E_j$ (j=1 to 10) is a coefficient of variation.

Next, effects of the optical scanning apparatus 1 of this embodiment will be described.

FIGS. 3A to 3D are diagrams showing effects on separation of exiting light beams depending on shapes of the fθ lens.

Figure 3A:
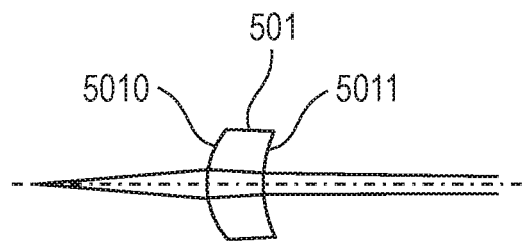
FIG. 3A is a diagram showing an effect on separation of exiting light beams depending on a shape of an fθ lens.
Figure 3B:
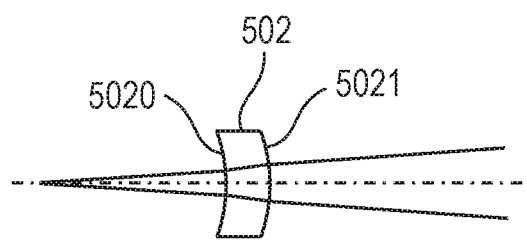
FIG. 3B is a diagram showing an effect on separation of exiting light beams depending on another shape of the fθ lens.

Specifically, FIG. 3A shows a case of an fθ lens 501 having a convex incident surface and a concave exit surface, and FIG. 3B shows a case of an fθ lens 502 having a concave incident surface and a convex exit surface. Meanwhile, FIG. 3C shows a case of an fθ lens 503 having a concave incident surface and a concave exit surface, and FIG. 3D shows a case of the first fθ lens 106 included in the optical scanning apparatus 1 of this embodiment.

In the fθ lens 501 shown in FIG. 3A, the light fluxes incident on an incident surface 5010 are refracted by the convex power in such a way as to reduce an interval therebetween. Then, the light fluxes exiting from an exit surface 5011 are refracted by the concave power in such a way as to increase the interval therebetween.

In the fθ lens 502 shown in FIG. 3B, the light fluxes incident on an incident surface 5020 are refracted by the concave power in such a way as to increase the interval therebetween. Then, the light fluxes exiting from an exit surface 5021 are refracted by the convex power in such a way as to reduce the interval therebetween.

Figure 3C:
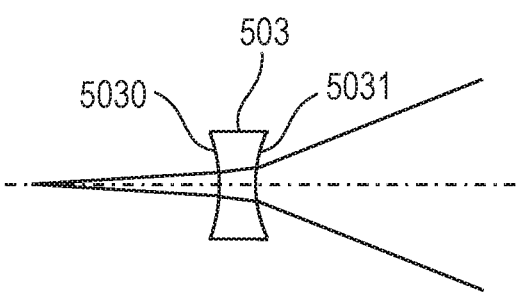
FIG. 3C is a diagram showing an effect on separation of exiting light beams depending on another shape of the fθ lens.
Figure 3D:
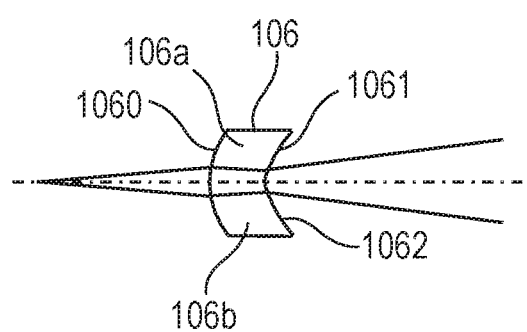
FIG. 3D is a diagram showing an effect on separation of exiting light beams depending on another shape of the fθ lens.

In the fθ lens 503 shown in FIG. 3C, the light fluxes incident on an incident surface 5030 are refracted by the concave power in such a way as to increase the interval therebetween. Then, the light fluxes exiting from an exit surface 5031 are refracted by the concave power in such a way as to further increase the interval therebetween.

In the first fθ lens 106 shown in FIG. 3D, the light fluxes incident on an incident surface 1060 are refracted by the convex power in such a way as to reduce the interval therebetween. Then, the light fluxes exiting from an exit surface 1061 of the first optical portion 106a and an exit surface 1062 of the second optical portion 106b are refracted by the concave power in such a way as to increase the interval therebetween.

In other words, the light flux incident on the incident surface of the first optical portion 106a and the light flux incident on the incident surface of the second optical portion 106b are refracted in such a way as to reduce the interval therebetween. Meanwhile, the light flux exiting from the exit surface 1061 of the first optical portion 106a and the light flux exiting from the exit surface 1062 of the second optical portion 106b are refracted in such a way as to increase the interval therebetween.

Furthermore, the first fθ lens 106 can refract the light fluxes in such a way as to increase the interval therebetween by using the sagittal tilt on the exit surface 1061 and the exit surface 1062.

As a result, the light beams can be separated while reducing the height of the first fθ lens 106.

Figure 4A:
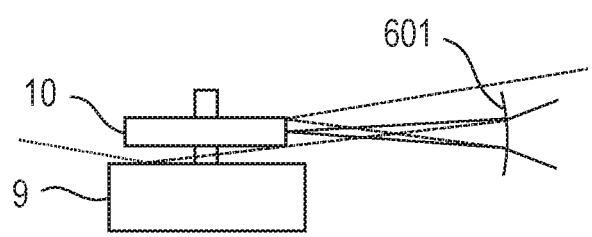
FIG. 4A is a diagram showing an effect of a shape of an incident surface of the fθ lens on ghost light.
Figure 4B:
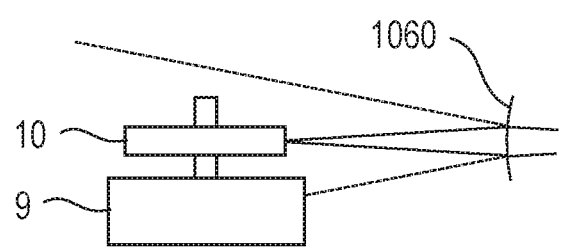
FIG. 4B is a diagram showing an effect of another shape of the incident surface of the fθ lens on ghost light.

FIGS. 4A and 4B are diagrams showing an effect of the shape of the incident surface of the fθ lens on ghost light.

To be more precise, FIG. 4A shows a case of the fθ lens having a concave incident surface 601 and FIG. 4B shows the case of the first fθ lens 106 of this embodiment having the convex incident surface 1060.

Note that dashed lines in each of FIGS. 4A and 4B indicate part of ghost light generated by the incident surface of the fθ lens.

In the meantime, a component 9 such as a motor that constitutes part of the deflecting unit 10 is also illustrated in each of FIGS. 4A and 4B.

When the incident surface 601 of the fθ lens is formed as the concave surface, the light fluxes reflected from the incident surface 601 may further be reflected from the deflecting surface of the deflecting unit 10 or reflected from the component 9, and are thus prone to generate the ghost light that may reach the scanned surface.

On the other hand, when the incident surface is formed as the convex surface, as in the case of the incident surface 1060 of the first fθ lens 106 of this embodiment, the light fluxes reflected from the incident surface 1060 are diffused as shown in FIG. 4B. For this reason, the reflected light fluxes are less likely to reach the deflecting unit 10. As a consequence, even if the ghost light are generated, an adverse effect therefrom is reduced as compared to the case where the incident surface is formed as the concave surface.

As described above, the use of the fθ lens having the concave incident surface and the concave exit surface as shown in FIG. 3C makes it possible to cause the light beams incident thereon to exit in such a way as to increase the interval therebetween to the maximum.

However, the ghost light that reaches the scanned surface is likely to be generated as shown in FIG. 4A in the case of using the aforementioned fθ lens.

In addition, such fθ lens has a large negative refractive power in the sub-scanning section and therefore increases sensitivity of the optical system. Accordingly, this configuration is not preferable in light of the optical performances including an imaging performance and the like.

Meanwhile, the use of the fθ lens having the concave incident surface and the convex exit surface as shown in FIG. 3B makes it possible to reduce the negative refractive power in the sub-scanning section as compared to the fθ lens of FIG. 3C.

However, this lens is likely to generate the ghost light that reaches the scanned surface as with the fθ lens of FIG. 3C. Moreover, this lens reduces the interval between the exiting light beams as compared to the fθ lens of FIG. 3C.

In the meantime, the use of the fθ lens having the convex incident surface and the concave exit surface as shown in FIG. 3A is not preferable because this lens cannot increase the interval between the exiting light beams.

Given the situation, the optical scanning apparatus 1 of this embodiment resolves the aforementioned problems by using the first fθ lens 106, which includes the first and second optical portions 106a and 106b each having the exit surface formed as the sagittal tilt variable surface.

Specifically, an amount of light beam separation, namely, the interval between the exiting light beams can be controlled by adjusting the amounts of sagittal tilt of the respective exit surfaces 1061 and 1062 of the first and second optical portions 106a and 106b.

Moreover, a sub-scanning magnification, namely, the refractive power in the sub-scanning section can be controlled by adjusting sagittal curvatures of the respective exit surfaces 1061 and 1062 of the first and second optical portions 106a and 106b.

Furthermore, the incident surface 1060 of the first fθ lens 106 is formed into the convex surface (which projects most toward the deflecting unit 10 at a position of a surface vertex on the incident surface of the first fθ lens 106 in the sub-scanning section including the surface vertex), which is preferable because the incident surface 1060 can thus suppress generation of the ghost light that reaches the scanned surface.

Thus, as shown in FIG. 2, the optical scanning apparatus 1 of this embodiment can avoid an interference of the light flux LA exiting from the first optical portion 106a of the first fθ lens 106 with the reflecting member 209, thus enabling an appropriate layout of the second fθ lenses 107 and 207.

Next, effects of the variations in sagittal tilt in the first fθ lens 106 of this embodiment will be described.

As mentioned above, the respective lens surfaces of the first fθ lens 106 of this embodiment have the refractive powers in the sub-scanning section, namely, the incident surface 1060 has the positive refractive power while each of the exit surfaces 1061 and 1062 of the first and second optical portions 106a and 106b has the negative power. Moreover, the first fθ lens 106 has the positive refractive power as a whole.

Accordingly, the respective lens surfaces are formed into the curved surfaces in the sub-scanning section, and therefore have the surface vertices.

FIGS. 5A to 5E are diagrams showing changes in sagittal tilt on the respective exit surfaces 1061 and 1062 of the first and second optical portions 106*a* and 106*b* of the first fθ lens 106 of this embodiment.

Figure 5A:
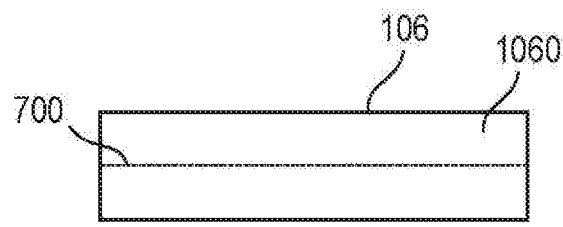
FIG. 5A is a diagram showing a change of the position of the surface vertex on the incident surface of the first fθ lens of the first embodiment in the main scanning direction
Figure 5B:
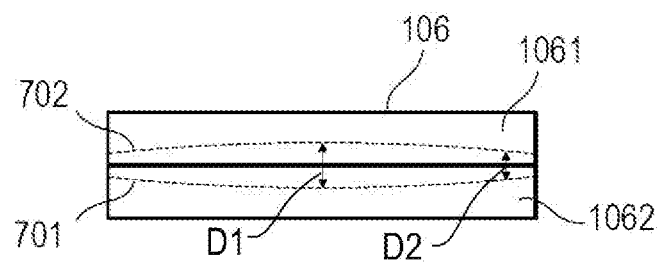
FIG. 5B is a diagram showing changes of the respective positions of the surface vertices on the exit surfaces of the first and second optical portions of the first fθ lens of the first embodiment in the main scanning direction.

Specifically, FIG. 5A shows a change of the position of the surface vertex on the incident surface 1060 of the first fθ lens 106 in the main scanning direction. Meanwhile, FIG. 5B shows changes of the respective positions of the surface vertices on the exit surfaces 1061 and 1062 of the first and second optical portions 106*a* and 106*b* of the first fθ lens 106 in the main scanning direction.

Figure 5C:
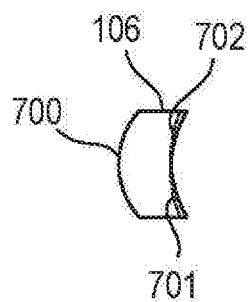
FIG. 5C is a diagram showing a sub-scanning section of the first fθ lens of the first embodiment at a scanning start end.
Figure 5D:
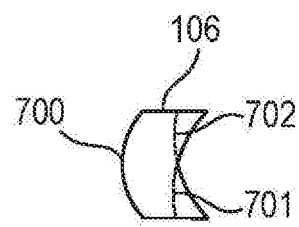
FIG. 5D is a diagram showing a sub-scanning section of the first fθ lens of the first embodiment at a central part.

On the other hand, FIG. 5C shows a sub-scanning sectional view of the first fθ lens 106 at a scanning start end, namely, at a position in the main scanning direction (a position of passage (an incident position) of an outermost off-axis ray) where the light flux directed to an outermost off-axis image height on a counter-light source side passes through the first fθ lens 106. Meanwhile, FIG. 5D shows a sub-scanning sectional view of the first fθ lens 106 at a central part, namely, at a position in the main scanning direction (a position of passage (an incident position) of an axial ray) where the light flux directed to an on-axis image height passes through the first fθ lens 106.

Figure 5E:
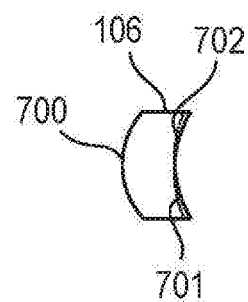
FIG. 5E is a diagram showing a sub-scanning section of the first fθ lens of the first embodiment at a scanning termination end.

In the meantime, FIG. 5E shows a sub-scanning sectional view of the first fθ lens 106 at a scanning termination end, namely, at a position in the main scanning direction (a position of passage (an incident position) of an outermost off-axis ray) where the light flux directed to an outermost off-axis image height on a light source side passes through the first fθ lens 106.

As shown in FIG. 5A, since the incident surface 1060 of the first fθ lens 106 does not adopt the sagittal tilt, the position of the surface vertex on the incident surface 1060 is located at a central part in the sub-scanning direction regardless of the position in the main scanning direction. In other words, the position of the surface vertex is constant as indicated with a dashed line 700.

On the other hand, as shown in FIG. 5B, the exit surfaces 1061 and 1062 of the first and second optical portions 106*a* and 106*b* of the first fθ lens 106 adopt the sagittal tilt and are each formed into the sagittal tilt variable surface in which the sagittal tilt varies depending on the position in the main scanning direction.

For this reason, the respective positions of the surface vertices on the exit surfaces 1061 and 1062 vary depending on the positions in the main scanning direction as indicated with dashed lines 701 and 702.

Meanwhile, as shown in FIGS. 5C to 5E, the interval between the positions of the surface vertices on the respective exit surfaces 1061 and 1062 is the widest at the central part and becomes decreased toward each end portion in the main scanning direction.

Moreover, the position of the surface vertex on the exit surface 1061 is located on the exit surface 1062 side in the sub-scanning direction across the entire region in the main scanning direction (an opposite side of the first optical portion 106*a* across the center in the sub-scanning direction of the first fθ lens 106, or an opposite side of the first optical portion 106*a* with respect to a main scanning section including the surface vertex on the incident surface of the first fθ lens 106). Meanwhile, the position of the surface vertex on the exit surface 1062 is located on the exit surface 1061 side in the sub-scanning direction across the entire region in the main scanning direction (an opposite side of the second optical portion 106*b* across the center in the sub-scanning direction of the first fθ lens 106, or an opposite side of the second optical portion 106*b* with respect to the main scanning section including the surface vertex on the incident surface of the first fθ lens 106).

As described above, the surface vertex cited herein represents a surface vertex on a virtual curved surface obtained by extending each of the exit surfaces 1061 and 1062.

Figure 6A:
FIG. 6A is a diagram showing an effect of sagittal tilt on the exit surfaces of the first and second optical portions of the first embodiment on curves of scanning lines.
Figure 6B:
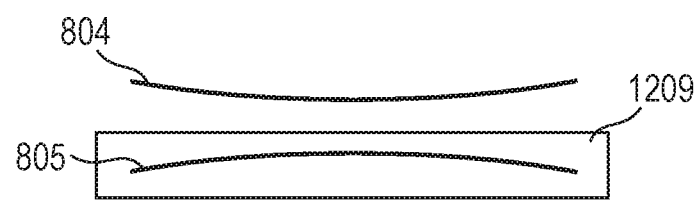
FIG. 6B is a diagram showing the effect of sagittal tilt on the exit surfaces of the first and second optical portions of a conventional example on curves of scanning lines.

FIGS. 6A and 6B are diagrams showing an effect of the sagittal tilt on the exit surfaces 1061 and 1062 of the first and second optical portions 106*a* and 106*b* of the first fθ lens 106 in the optical scanning apparatus 1 according to the first embodiment on curves of scanning lines.

Specifically, FIG. 6A shows scanning lines 802 and 803 originating from the light fluxes LA and LB exiting, respectively, from the exit surfaces 1061 and 1062 on a cross-section 1 that includes a reflecting point for the axial ray on the reflecting member 209 and is perpendicular to the main scanning section and to the sub-scanning section as shown in FIG. 2.

On the other hand, FIG. 6B shows scanning lines 804 and 805 originating from the light fluxes LA and LB exiting from an exit surface on the cross-section 1 in the case of arranging a conventional fθ lens not adopting the sagittal tilt and a conventional reflecting member 1209 instead of the first fθ lens 106 and the reflecting member 209.

As mentioned above, the interval between the positions of the surface vertices on the respective exit surfaces 1061 and 1062 is the widest at the central part and becomes decreased toward each end portion in the main scanning direction (that is, comes close to the central part in the sub-scanning direction of the first fθ lens 106).

In other words, the amounts of sagittal tilt of the exit surfaces 1061 and 1062 becomes decreased toward each end portion in the main scanning direction.

To sum up the foregoing discussions, as the amounts of sagittal tilt on the respective exit surfaces 1061 and 1062 become smaller toward the end portions in the main scanning direction, the interval between the light fluxes LA and LB exiting from the exit surfaces 1061 and 1062, respectively, becomes narrower.

As a consequence, the interval between the scanning lines 802 and 803 originating from the light fluxes LA and LB becomes narrower toward each end portion in the main scanning direction, whereby amounts of curve of the respective scanning lines 802 and 803 can be reduced.

As described above, according to the optical scanning apparatus 1 of this embodiment, the amounts of curve of the scanning lines can be reduced by forming each of the exit surfaces 1061 and 1062 of the first and second optical portions 106*a* and 106*b* of the first fθ lens 106 into the sagittal tilt variable surface.

As a consequence, it is possible to reduce the size of the reflecting member for reflecting the light flux exiting from the first fθ lens 106 in such a way as to reduce the area of a reflecting surface of the reflecting member.

The optical scanning apparatus 1 of this embodiment can reduce the amounts of curve of the scanning lines by using the above-described first fθ lens 106, and thus to provide the optical scanning apparatus that achieves further reduction in size.

In addition, the optical scanning apparatus 1 can suppress an interference between optical members by adjusting the amount of light beam separation while maintaining optical performances concerning the sub-scanning magnification, generation of the ghost light, and the like.

Figure 7:
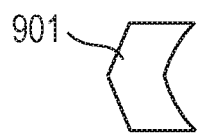
FIG. 7 is a diagram showing an alternative shape of the first fθ lens.

Although the optical scanning apparatus 1 of this embodiment adopts the first fθ lens 106 having the convex incident surface, the present invention is not limited only to this configuration. For example, similar effects can also be expected by using an fθ lens 901 as shown in FIG. 7, which is formed into such a shape that the central part of the first fθ lens 106 projects to the incident side by forming the incident surfaces of the first and second optical portions 106a and 106b into tilt surfaces.

Second Embodiment

Figure 8A:
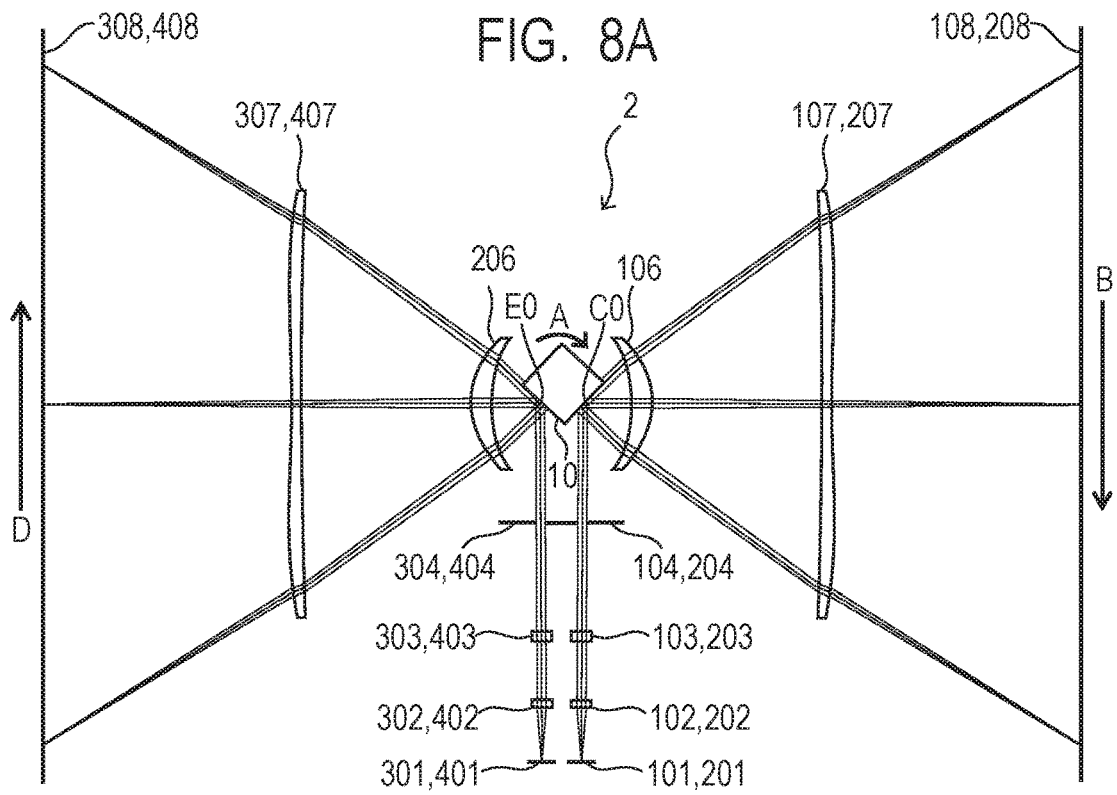
FIG. 8A is a development diagram in a main scanning section of an optical scanning apparatus according to a second embodiment.
Figure 8B:
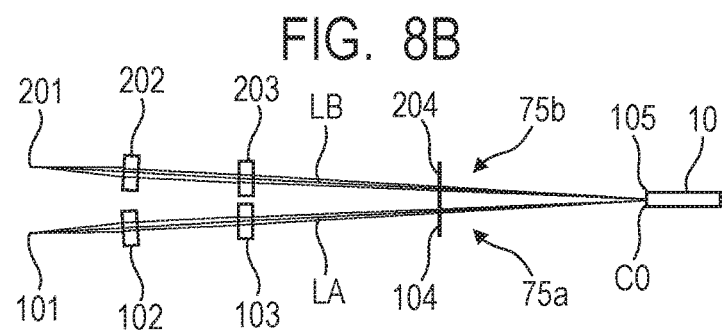
FIG. 8B is a development diagram in a sub-scanning section of incident optical systems included in the optical scanning apparatus according to the second embodiment.
Figure 8C:
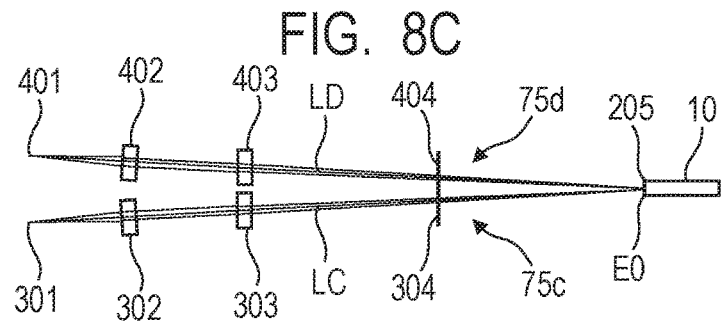
FIG. 8C is a development diagram in a sub-scanning section of more incident optical systems included in the optical scanning apparatus according to the second embodiment.
Figure 8D:
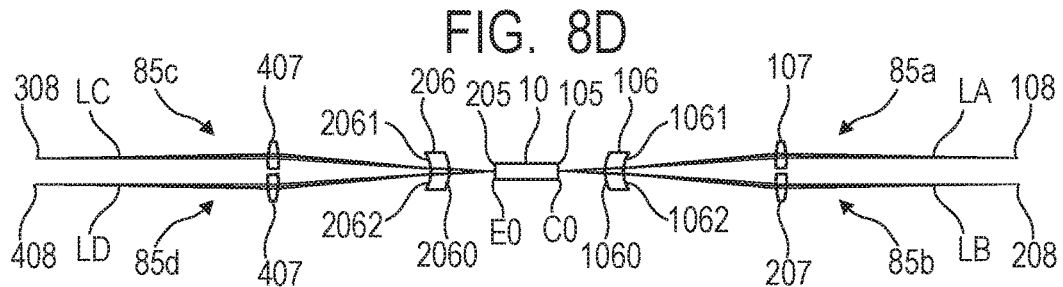
FIG. 8D is a development diagram in the sub-scanning section of scanning optical systems included in the optical scanning apparatus according to the second embodiment.
Figure 9:
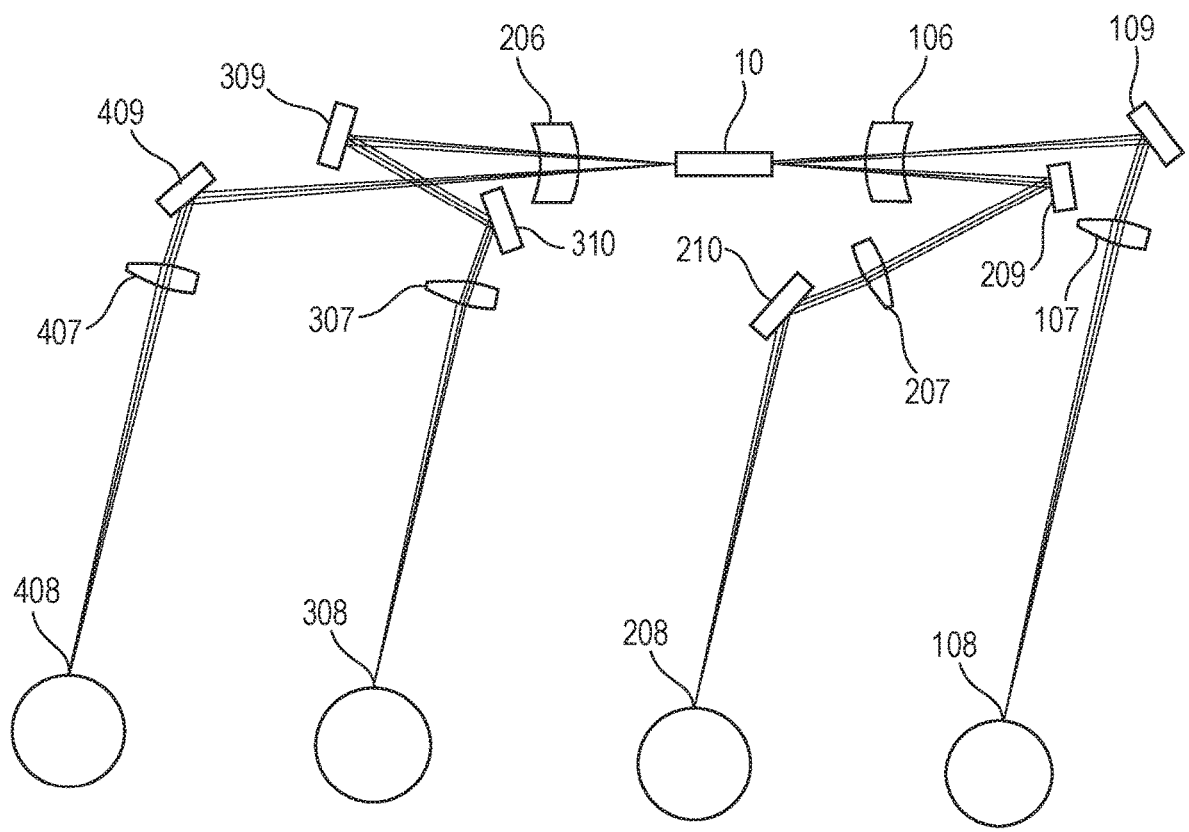
FIG. 9 is a sub-scanning sectional view of the scanning optical systems included in the optical scanning apparatus according to the second embodiment.

FIG. 8A shows a development diagram in a main scanning section of an optical scanning apparatus 2 according to a second embodiment. FIGS. 8B and 8C show development diagrams in a sub-scanning section of incident optical systems included in the optical scanning apparatus 2 according to the second embodiment, respectively. FIG. 8D shows a development diagram in the sub-scanning section of scanning optical systems included in the optical scanning apparatus 2 according to the second embodiment. FIG. 9 shows a sub-scanning sectional view of the scanning optical systems included in the optical scanning apparatus 2 according to the second embodiment.

The optical scanning apparatus 2 of this embodiment includes first, second, third, and fourth light sources 101, 201, 301, and 401, and first, second, third, and fourth collimator lenses 102, 202, 302, and 402. Moreover, the optical scanning apparatus 2 of this embodiment includes first, second, third, and fourth cylindrical lenses 103, 203, 303, and 403, and first, second, third, and fourth aperture stops 104, 204, 304, and 404.

Furthermore, the optical scanning apparatus 2 of this embodiment includes the deflecting unit 10, the first fθ lenses 106 and 206 (the first and second optical elements), second fθ lenses 107, 207, 307, and 407, and reflecting members 109, 209, 210, 309, 310, and 409.

Semiconductor laser or the like is used for each of the first, second, third, and fourth light sources 101, 201, 301, and 401.

The first, second, third, and fourth collimator lenses 102, 202, 302, and 402 convert light fluxes LA, LB, LC, and LD (first, second, third, and fourth light fluxes) emitted from the first to fourth light sources 101 to 401 into parallel light fluxes. Here, the parallel light fluxes include not only strictly parallel light fluxes but also substantially parallel light fluxes such as weak divergent light fluxes and weak convergent light fluxes.

Each of the first, second, third, and fourth cylindrical lenses 103, 203, 303, and 403 has a finite power (a refractive power) in a sub-scanning section. The light fluxes LA to LD passed through the first to fourth collimator lenses 102 to 402 are condensed in the sub-scanning direction with the first to fourth cylindrical lenses 103 to 403.

The first, second, third, and fourth aperture stops 104, 204, 304, and 404 limit light flux diameters of the light fluxes LA to LD passed through the first to fourth cylindrical lenses 103 to 403.

Thus, the light fluxes LA and LB emitted from the first and second light sources 101 and 201 are condensed only in the sub-scanning direction in the vicinity of a first deflecting surface 105 of the deflecting unit 10, and are formed into linear images each being long in the main scanning direction.

In the meantime, the light fluxes LC and LD emitted from the third and fourth light sources 301 and 401 are condensed only in the sub-scanning direction in the vicinity of a second deflecting surface 205 of the deflecting unit 10, and are formed into linear images each being long in the main scanning direction.

The deflecting unit 10 is rotated in a direction of an arrow A in FIG. 8A by a not-illustrated driving unit such as a motor, thus deflecting the light fluxes LA to LD incident on the deflecting unit 10. Here, the deflecting unit 10 is formed from a polygon mirror, for example.

Each of the first fθ lens 106 and the second fθ lenses 107 and 207 is an anamorphic imaging lens having different powers in the main scanning section and in the sub-scanning section. Moreover, each of the first fθ lens 106 and the second fθ lenses 107 and 207 condenses (guides) the light fluxes LA and LB deflected by the first deflecting surface 105 of the deflecting unit 10 onto the first and second scanned surfaces 108 and 208.

Meanwhile, each of the first fθ lens 206 and the second fθ lenses 307 and 407 is an anamorphic imaging lens having different powers in the main scanning section and in the sub-scanning section. Moreover, each of the first fθ lens 206 and the second fθ lenses 307 and 407 condenses (guides) the light fluxes LC and LD deflected by the second deflecting surface 205 of the deflecting unit 10 onto third and fourth scanned surfaces 308 and 408.

Here, the first fθ lens 106 is the multi-stage lens in which the first optical portion 106a and the second optical portion 106b are arranged side by side in the sub-scanning direction. Specifically, the incident surface of the first fθ lens 106 is formed from the incident surface of the first optical portion 106a and the incident surface of the second optical portion 106b, while the exit surface of the first fθ lens 106 is formed from the exit surface of the first optical portion 106a and the exit surface of the second optical portion 106b. Moreover, the exit surfaces of the first optical portion 106a and the second optical portion 106b are the sagittal tilt variable surfaces having shapes with amounts of sagittal tilt different from each other, and each of the amounts of sagittal tilt varies in the main scanning direction.

Meanwhile, the first fθ lens 206 is a multi-stage lens in which a first optical portion 206a (a third optical portion) and a second optical portion 206b (a fourth optical portion) are arranged side by side in the sub-scanning direction. Specifically, an incident surface of the first fθ lens 206 is formed from an incident surface of the first optical portion 206a and an incident surface of the second optical portion 206b, while an exit surface of the first fθ lens 206 is formed from an exit surface of the first optical portion 206a (a third exit surface) and an exit surface of the second optical portion 206b (a fourth exit surface). Moreover, the exit surfaces of the first optical portion 206a and the second optical portion 206b are sagittal tilt variable surfaces having shapes with amounts of sagittal tilt different from each other, and each of the amounts of sagittal tilt varies in the main scanning direction.

The reflecting members 109, 209, 210, 309, 310, and 409 are units for reflecting the light fluxes, which employ deposited mirrors and the like.

In the optical scanning apparatus 2 of this embodiment, the first incident optical system 75a is formed from the first collimator lens 102, the first cylindrical lens 103, and the first aperture stop 104. Moreover, the second incident optical system 75b is formed from the second collimator lens 202, the second cylindrical lens 203, and the second aperture stop 204.

Meanwhile, a third incident optical system 75c is formed from the third collimator lens 302, the third cylindrical lens 303, and the third aperture stop 304. Moreover, a fourth incident optical system 75d is formed from the fourth collimator lens 402, the fourth cylindrical lens 403, and the fourth aperture stop 404.

In the meantime, in the optical scanning apparatus 2 of this embodiment, the first scanning optical system 85a is formed from the first optical portion 106a of the first fθ lens 106 and the second fθ lens 107. Moreover, the second scanning optical system 85b is formed from the second optical portion 106b of the first fθ lens 106 and the second fθ lens 207.

Meanwhile, a third scanning optical system 85c is formed from the first optical portion 206a of the first fθ lens 206 and the second fθ lens 307. Moreover, a fourth scanning optical system 85d is formed from the second optical portion 206b of the first fθ lens 206 and the second fθ lens 407.

In the meantime, in the optical scanning apparatus 2 of this embodiment, the first reflecting optical system 95a is formed from the reflecting member 109, and the second reflecting optical system 95b is formed from the reflecting members 209 and 210.

Meanwhile, a third reflecting optical system 95c is formed from the reflecting members 309 and 310, and a fourth reflecting optical system 95d is formed from the reflecting member 409.

Incidentally, in the optical scanning apparatus 2 of this embodiment, the optical axes of the first and second incident optical systems 75a and 75b form angles of +3.0 degrees and −3.0 degrees, respectively, in the sub-scanning section with respect to the main scanning section.

Meanwhile, optical axes of the third and fourth incident optical systems 75c and 75d form angles of +3.0 degrees and −3.0 degrees, respectively, in the sub-scanning section with respect to the main scanning section.

The light flux LA emitted from the light emitting point of the first light source 101 is converted into the parallel light flux by the first collimator lens 102.

Then, the converted light flux LA is condensed in the sub-scanning direction by the first cylindrical lens 103, passed through the first aperture stop 104, and is incident on the first deflecting surface 105 of the deflecting unit 10 from a lower side in the sub-scanning direction.

Thereafter, the light flux LA emitted from the first light source 101 and incident on the first deflecting surface 105 of the deflecting unit 10 is deflected by the deflecting unit 10 and is then condensed on the first scanned surface 108 with the first scanning optical system 85a, thus scanning the first scanned surface 108 at a uniform velocity.

The light flux LB emitted from the light emitting point of the second light source 201 is converted into the parallel light flux by the second collimator lens 202.

Then, the converted light flux LB is condensed in the sub-scanning direction by the second cylindrical lens 203, passed through the second aperture stop 204, and is incident on the first deflecting surface 105 of the deflecting unit 10 from an upper side in the sub-scanning direction.

The light flux LB emitted from the second light source 201 and incident on the first deflecting surface 105 of the deflecting unit 10 is deflected by the deflecting unit 10 and is then condensed on the second scanned surface 208 with the second scanning optical system 85b, thus scanning the second scanned surface 208 at a uniform velocity.

The light flux LC emitted from a light emitting point of the third light source 301 is converted into the parallel light flux by the third collimator lens 302.

Then, the converted light flux LC is condensed in the sub-scanning direction by the third cylindrical lens 303, passed through the third aperture stop 304, and is incident on the second deflecting surface 205 of the deflecting unit 10 from a lower side in the sub-scanning direction.

Thereafter, the light flux LC emitted from the third light source 301 and incident on the second deflecting surface 205 of the deflecting unit 10 is deflected by the deflecting unit 10 and is then condensed on the third scanned surface 308 with the third scanning optical system 85c, thus scanning the third scanned surface 308 at a uniform velocity.

The light flux LD emitted from a light emitting point of the fourth light source 401 is converted into the parallel light flux by the fourth collimator lens 402.

Then, the converted light flux LD is condensed in the sub-scanning direction by the fourth cylindrical lens 403, passed through the fourth aperture stop 404, and is incident on the second deflecting surface 205 of the deflecting unit 10 from an upper side in the sub-scanning direction.

The light flux LD emitted from the fourth light source 401 and incident on the second deflecting surface 205 of the deflecting unit 10 is deflected by the deflecting unit 10 and is then condensed on the fourth scanned surface 408 with the fourth scanning optical system 85d, thus scanning the fourth scanned surface 408 at a uniform velocity.

Here, the deflecting unit 10 is rotated in the direction A in FIG. 8A. Accordingly, the deflected light fluxes LA and LB scan the first and second scanned surfaces 108 and 208 in a direction B in FIG. 8A, respectively. Moreover, the deflected light fluxes LC and LD scan the third and fourth scanned surfaces 308 and 408 in a direction D in FIG. 8A, respectively.

Meanwhile, reference numeral C0 denotes the deflection point (the axial deflection point) on the first deflecting surface 105 of the deflecting unit 10 relative to the principal ray of the axial flux. In terms of the sub-scanning direction, the light fluxes LA and LB emitted from the first and second light sources 101 and 201 cross each other at the deflection point C0. In the meantime, the deflection point C0 serves as the reference point of the first and second scanning optical systems 85a and 85b.

On the other hand, reference numeral E0 denotes a deflection point (an axial deflection point) on the second deflecting surface 205 of the deflecting unit 10 relative to the principal ray of the axial flux. In terms of the sub-scanning direction, the light fluxes LC and LD emitted from the third and fourth light sources 301 and 401 cross each other at the deflection point E0. In the meantime, the deflection point E0 serves as a reference point of the third and fourth scanning optical systems 85c and 85d.

Note that first, second, third, and fourth photosensitive drums 108, 208, 308, and 408 are used as the first, second, third, and fourth scanned surfaces 108, 208, 308, and 408 in this embodiment.

Meanwhile, formation of exposure distribution in the sub-scanning direction on the first to fourth photosensitive drums 108 to 408 is achieved by rotating the first to fourth photosensitive drums 108 to 408 in the sub-scanning direction in each session of main scanning exposure.

Next, characteristics of the third and fourth incident optical systems 75c and 75d and the third and fourth scanning optical systems 85c and 85d of the optical scanning apparatus 2 of this embodiment will be listed in the following Tables 4 to 6.

Note that the characteristics of the first and second incident optical systems 75a and 75b and the first and second scanning optical systems 85a and 85b are the same as those of the optical scanning apparatus 1 according to the first embodiment listed in Tables 1 to 3. Accordingly, the duplicate listing will be omitted herein.

TABLE 4

| characteristics of light sources 301 and 401 | | |
| --- | --- | --- |
| number of light emitting points | N (points) | 2 |
| rotation angles of light sources 301 and 401 | (deg) | 6.54 |
| array | (dimensions) | 1 |
| pitch | pitch (mm) | 0.09 |
| wavelength | λ (nm) | 790 |
| incident polarization to second deflecting surface 205 of deflecting unit 10 | | p polarization |
| full angle at half maximum in main scanning direction | FFPy (deg) | 12.00 |
| full angle at half maximum in sub-scanning direction | FFPz (deg) | 30.00 |

| forms of stops | | |
| --- | --- | --- |
| | main scanning direction | sub-scanning direction |
| aperture stops 304 and 404 | 3.050 | 0.782 |

| refractive indices | | |
| --- | --- | --- |
| collimator lenses 302 and 402 | N1 | 1.762 |
| cylindrical lenses 303 and 403 | N2 | 1.524 |

| forms of optical elements | | | |
| --- | --- | --- | --- |
| | | main scanning direction | sub-scanning direction |
| curvature radius of incident surfaces of collimator lenses 302 and 402 | r1a (mm) | ∞ | ∞ |
| curvature radius of exit surfaces of collimator lenses 302 and 402 | r1b (mm) | −15.216 | −15.216 |
| curvature radius of incident surfaces of cylindrical lenses 303 and 403 | r2a (mm) | ∞ | 41.028 |
| curvature radius of exit surfaces of cylindrical lenses 303 and 403 | r2b (mm) | ∞ | ∞ |

| focal lengths | | | |
| --- | --- | --- | --- |
| | | main scanning direction | sub-scanning direction |
| collimator lenses 302 and 402 | fcol (mm) | 19.98 | 19.98 |
| cylindrical lenses 303 and 403 | fcyl (mm) | ∞ | 78.30 |

| arrangement | | |
| --- | --- | --- |
| light sources 301 and 401 to collimator lenses 302 and 402 | d0 (mm) | 18.31 |
| incident surfaces of collimator lenses 302 and 402 to exit surfaces of collimator lenses 302 and 402 | d1 (mm) | 3.00 |
| exit surfaces of collimator lenses 302 and 402 to incident surfaces of cylindrical lenses 303 and 403 | d2 (mm) | 19.77 |
| incident surfaces of cylindrical lenses 303 and 403 to exit surfaces of cylindrical lenses 303 and 403 | d3 (mm) | 3.00 |
| exit surfaces of cylindrical lenses 303 and 403 to aperture stops 304 and 404 | d4 (mm) | 36.71 |
| aperture stops 304 and 404 to the second deflecting surface 205 of the deflecting unit 10 | d5 (mm) | 40.33 |
| angle of incidence in main scanning section of light exiting from aperture stop 304 into second deflecting surface 205 | A1 (deg) | −90.00 |
| angle of incidence in main scanning section of light exiting from aperture stop 404 into second deflecting surface 205 | A2 (deg) | −90.00 |
| angle of incidence in sub-scanning section of light exiting from aperture stop 304 into second deflecting surface 205 | A3 (deg) | 3.00 |
| angle of incidence in sub-scanning section of light exiting from aperture stop 404 into second deflecting surface 205 | A4 (deg) | −3.00 |

TABLE 5

| fθ coefficient, scanning width, and angle of view | | |
|---|---|---|
| fθ coefficient | k (mm/rad) | 146 |
| scanning width | W (mm) | 230 |
| maximum angle of view | θ (deg) | 45.1 |
| refractive indices | | |
| refractive index of first fθ lens 206 | N5 | 1.524 |
| refractive index of second fθ lens 307 | N6 | 1.524 |
| deflecting unit | | |
| number of deflecting surfaces | | 4 |
| circumradius | Rpol (mm) | 10 |
| rotation center to deflection point E0 (optical axis direction) | Xpol (mm) | 5.74 |
| rotation center to deflection point E0 (main scanning direction) | Ypol (mm) | 4.26 |
| scanning optical system arrangement | | |
| deflection point E0 to incident surface of first optical portion 206a | d12 (mm) | 17.00 |
| incident surface of first optical portion 206a to exit surface of first optical portion 206a | d13 (mm) | 6.70 |
| exit surface of first optical portion 206a to incident surface of second fθ lens 307 | d14 (mm) | 72.30 |
| incident surface of second fθ lens 307 to exit surface of second fθ lens 307 | d15 (mm) | 3.50 |
| exit surface of second fθ lens 307 to third scanned surface 308 | d16 (mm) | 68.50 |
| deflection point E0 to incident surface of second fθ lens 307 | L2 (mm) | 96.00 |
| deflection point E0 to third scanned surface 308 | T2 (mm) | 168.00 |
| amount of sub-scanning eccentricity of second fθ lens 307 | shiftZ (mm) | 6.86 | shape of meridional line of first optical portion 206a

| | incident surface counter-light source side | exit surface counter-light source side |
|---|---|---|
| R | −49.912 | −30.370 |
| ku | 3.517E+00 | −3.284E+00 |
| B4u | 8.144E−06 | −1.046E−05 |
| B6u | 1.731E−08 | 1.703E−08 |
| B8u | −6.571E−11 | −2.092E−11 |
| B10u | 8.472E−14 | −8.007E−15 |
| B12u | 0 | 0 |
| | light source side | light source side |
| kl | 3.517E+00 | −3.284E+00 |
| B4l | 8.144E−06 | −1.050E−05 |
| B6l | 1.731E−08 | 1.749E−08 |
| B8l | −6.571E−11 | −2.257E−11 |
| B10l | 8.472E−14 | −6.096E−15 |
| B12l | 0 | 0 | shape of sagittal line of first optical portion 206a

| | incident surface change in sagittal radius | exit surface change in sagittal radius |
|---|---|---|
| r | 13.000 | 22.244 |
| E1 | 0 | −1.642E−04 |
| E2 | 0 | −1.204E−03 |
| E3 | 0 | 0 |
| E4 | 0 | 1.538E−06 |
| E5 | 0 | 0 |
| E6 | 0 | −9.773E−10 |
| E7 | 0 | 0 |
| E8 | 0 | 0 |
| E9 | 0 | 0 |
| E10 | 0 | 0 |
| | sagittal tilt | sagittal tilt |
| M0_1 | 0 | −8.101E−02 |
| M1_1 | 0 | 1.262E−06 |

TABLE 5-continued

| M2_1 | 0 | 9.130E−05 |
|---|---|---|
| M3_1 | 0 | 9.910E−08 |
| M4_1 | 0 | −1.107E−08 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 | shape of meridional line of second fθ lens 307

| | incident surface counter-light source side | exit surface counter-light source side |
|---|---|---|
| R | −10000 | 279.878 |
| ku | 0 | −5.367E+01 |
| B4u | 0 | −3.311E−07 |
| B6u | 0 | 4.279E−11 |
| B8u | 0 | −4.922E−15 |
| B10u | 0 | 3.461E−19 |
| B12u | 0 | −1.034E−23 |
| | light source side | light source side |
| kl | 0 | −5.367E+01 |
| B4l | 0 | −3.335E−07 |
| B6l | 0 | 4.318E−11 |
| B8l | 0 | −4.880E−15 |
| B10l | 0 | 3.327E−19 |
| B12l | 0 | −9.723E−24 | shape of sagittal line of second fθ lens 307

| | incident surface change in sagittal radius | exit surface change in sagittal radius |
|---|---|---|
| r | 22.604 | −1000 |
| E1 | 9.474E−05 | 0 |
| E2 | 8.693E−05 | 0 |
| E3 | 0 | 0 |
| E4 | −4.848E−09 | 0 |
| E5 | 0 | 0 |
| E6 | 1.645E−13 | 0 |
| E7 | 0 | 0 |
| E8 | −2.038E−17 | 0 |
| E9 | 0 | 0 |
| E10 | 0 | 0 |
| | sagittal tilt | sagittal tilt |
| M0_1 | −1.683E−01 | 2.737E−02 |
| M1_1 | −2.480E−04 | −2.605E−04 |
| M2_1 | 6.372E−06 | −1.325E−05 |
| M3_1 | 4.718E−08 | 4.429E−08 |
| M4_1 | −2.700E−09 | 5.426E−10 |
| M5_1 | −5.354E−28 | 2.061E−28 |
| M6_1 | 3.256E−14 | −3.757E−13 |
| M7_1 | 8.193E−16 | 3.438E−16 |
| M8_1 | 1.575E−16 | 1.071E−16 |
| M9_1 | −2.174E−20 | 6.387E−20 |
| M10_1 | −3.849E−21 | 6.178E−21 |
| M11_1 | 0 | 0 |
| M12_1 | 0 | 0 |

TABLE 6 fθ coefficient, scanning width, and angle of view

| | | |
|---|---|---|
| fθ coefficient | k (mm/rad) | 146 |
| scanning width | W (mm) | 230 |
| maximum angle of view | θ (deg) | 45.1 | refractive indices

| | | |
|---|---|---|
| refractive index of second optical portion 206b | N5 | 1.524 |
| refractive index of second fθ lens 407 | N6 | 1.524 | deflecting unit

| | | |
|---|---|---|
| number of deflecting surfaces | | 4 |
| circumradius | Rpol (mm) | 10 |
| rotation center to deflection point E0 (optical axis direction) | Xpol (mm) | 5.74 |
| rotation center to deflection point E0 (main scanning direction) | Ypol (mm) | 4.26 | scanning optical system arrangement

| | | |
|---|---|---|
| deflection point E0 to incident surface of second optical portion 206b | d12 (mm) | 17.00 |
| incident surface of second optical portion 206b to exit surface of second optical portion 206b | d13 (mm) | 6.70 |
| exit surface of second optical portion 206b to incident surface of second fθ lens 407 | d14 (mm) | 72.30 |
| incident surface of second fθ lens 407 to exit surface of second fθ lens 407 | d15 (mm) | 3.50 |
| exit surface of second fθ lens 407 to fourth scanned surface 408 | d16 (mm) | 68.50 |
| deflection point E0 to incident surface of second fθ lens 407 | L2 (mm) | 96.00 |
| deflection point E0 to fourth scanned surface 408 | T2 (mm) | 168.00 |
| amount of sub-scanning eccentricity of second fθ lens 407 | shiftZ (mm) | 6.86 | shape of meridional line of second optical portion 206b

| | incident surface counter-light source side | exit surface counter-light source side |
|---|---|---|
| R | −49.912 | −30.370 |
| ku | 3.517E+00 | −3.284E+00 |
| B4u | 8.144E−06 | −1.046E−05 |
| B6u | 1.731E−08 | 1.703E−08 |
| B8u | −6.571E−11 | −2.092E−11 |
| B10u | 8.472E−14 | −8.007E−15 |
| B12u | 0 | 0 |

| | light source side | light source side |
|---|---|---|
| kl | 3.517E+00 | −3.284E+00 |
| B4l | 8.144E−06 | −1.050E−05 |
| B6l | 1.731E−08 | 1.749E−08 |
| B8l | −6.571E−11 | −2.257E−11 |
| B10l | 8.472E−14 | −6.096E−15 |
| B12l | 0 | 0 | shape of sagittal line of second optical portion 206b

| | incident surface change in sagittal radius | exit surface change in sagittal radius |
|---|---|---|
| r | 13.000 | 22.244 |
| E1 | 0 | −1.642E−04 |
| E2 | 0 | −1.204E−03 |
| E3 | 0 | 0 |
| E4 | 0 | 1.538E−06 |
| E5 | 0 | 0 |
| E6 | 0 | −9.773E−10 |
| E7 | 0 | 0 |
| E8 | 0 | 0 |
| E9 | 0 | 0 |
| E10 | 0 | 0 |

TABLE 6-continued

| | sagittal tilt | sagittal tilt |
|---|---|---|
| M0_1 | 0 | 8.101E−02 |
| M1_1 | 0 | −1.262E−06 |
| M2_1 | 0 | −9.130E−05 |
| M3_1 | 0 | 9.910E−08 |
| M4_1 | 0 | −1.107E−08 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 | shape of meridional line of second fθ lens 407

| | incident surface counter-light source side | exit surface counter-light source side |
|---|---|---|
| R | −10000 | 279.878 |
| ku | 0 | −5.367E+01 |
| B4u | 0 | −3.311E−07 |
| B6u | 0 | 4.279E−11 |
| B8u | 0 | −4.922E−15 |
| B10u | 0 | 3.461E−19 |
| B12u | 0 | −1.034E−23 |

| | light source side | light source side |
|---|---|---|
| kl | 0 | −5.367E+01 |
| B4l | 0 | −3.335E−07 |
| B6l | 0 | 4.318E−11 |
| B8l | 0 | −4.880E−15 |
| B10l | 0 | 3.327E−19 |
| B12l | 0 | −9.723E−24 | shape of sagittal line of second fθ lens 407

| | incident surface change in sagittal radius | exit surface change in sagittal radius |
|---|---|---|
| r | 22.604 | −1000 |
| E1 | 9.474E−05 | 0 |
| E2 | 8.693E−05 | 0 |
| E3 | 0 | 0 |
| E4 | −4.848E−09 | 0 |
| E5 | 0 | 0 |
| E6 | 1.645E−13 | 0 |
| E7 | 0 | 0 |
| E8 | −2.038E−17 | 0 |
| E9 | 0 | 0 |
| E10 | 0 | 0 |

| | sagittal tilt | sagittal tilt |
|---|---|---|
| M0_1 | −1.683E−01 | 2.737E−02 |
| M1_1 | −2.480E−04 | −2.605E−04 |
| M2_1 | 6.372E−06 | −1.325E−05 |
| M3_1 | 4.718E−08 | 4.429E−08 |
| M4_1 | −2.700E−09 | 5.426E−10 |
| M5_1 | −5.354E−28 | 2.061E−28 |
| M6_1 | 3.256E−14 | −3.757E−13 |
| M7_1 | 8.193E−16 | 3.438E−16 |
| M8_1 | 1.575E−16 | 1.071E−16 |
| M9_1 | −2.174E−20 | 6.387E−20 |
| M10_1 | −3.849E−21 | 6.178E−21 |
| M11_1 | 0 | 0 |
| M12_1 | 0 | 0 |

Note that in Tables 4 to 6, the direction of the optical axis, the axis orthogonal to the optical axis in the main scanning section, and the axis orthogonal to the optical axis in the sub-scanning section in the case where the intersection point of each lens surface and the optical axis is defined as the point of origin are defined as the x axis, the y axis, and the z axis, respectively. In addition, in Tables 5 and 6, the expression "E-x" means "×10$^{-x}$".

The aspheric surface shape (the meridional shape) in the main scanning section of each of the lens surfaces of the first and second optical portions 206a and 206b of the first fθ lens 206, and the second fθ lenses 307 and 407 of the optical scanning apparatus 2 of this embodiment is defined by the above-described expression (1).

Meanwhile, the aspheric surface shape (the sagittal shape) in the sub-scanning section of each of the lens surfaces of the first and second optical portions 206a and 206b of the first fθ lens 206, and the second fθ lenses 307 and 407 is defined by the above-described expression (2).

In the meantime, the curvature radius r' in the sub-scanning section continuously varies in accordance with the y coordinate of the lens surface as defined in the above-described expression (3).

Next, effects of the optical scanning apparatus 2 of this embodiment will be described. Note that explanations of the same effects as those of the optical scanning apparatus 1 of the first embodiment will be omitted.

In the optical scanning apparatus 2 of this embodiment, the single deflecting unit 10 can scan the four scanned surfaces 108, 208, 308, and 408.

Moreover, the distance on the optical path from the deflection point C0 to each incident surface of the second fθ lenses 107 and 207 is different from the distance on the optical path from the deflection point E0 to each incident surface of the second fθ lenses 307 and 407.

As a consequence, it is possible to avoid interferences among the fθ lenses and the reflecting members as shown in FIG. 9, and thus to obtain the small optical scanning apparatus.

FIG. 10 shows sub-scanning sectional views of the first fθ lenses 106 and 206 included in the optical scanning apparatus 2 of this embodiment.

As described above, the distance on the optical path from the deflection point to each of the second fθ lenses 107 and 207 is different from the distance on the optical path from the deflection point to each of the second fθ lenses 307 and 407.

For this reason, in the optical scanning apparatus 2 of this embodiment, the first fθ lens 106 and the first fθ lens 206 have different shapes from each other as shown in FIG. 10.

In other words, the incident surface 1060 of the first fθ lens 106 and an incident surface 2060 of the first fθ lens 206 have different shapes from each other. Moreover, each of the exit surfaces 1061 and 1062 of the first and second optical portions 106a and 106b of the first fθ lens 106 has a different shape from each of exit surfaces 2061 and 2062 of first and second optical portions 206a and 206b of the first fθ lens 206.

Specifically, characteristics of the first fθ lenses 106 and 206 are configured as listed in the following Table 7, respectively.

TABLE 7

|  | first fθ lens 106 | | | first fθ lens 206 | | |
|---|---|---|---|---|---|---|
|  | incident surface | exit surface | whole system | incident surface | exit surface | whole system |
| refractive index |  | 1.524 |  |  | 1.524 |  |
| lens thickness |  | 6.7 |  |  | 6.7 |  |

TABLE 7-continued

|  | first fθ lens 106 | | | first fθ lens 206 | | |
|---|---|---|---|---|---|---|
|  | incident surface | exit surface | whole system | incident surface | exit surface | whole system |
| curvature radius | 13 | 11.268 | — | 13 | 22.244 | — |
| refractive power in sub-scanning section | 0.0403 | −0.0465 | 0.0020 | 0.0403 | −0.0236 | 0.0209 |
| amount of sagittal tilt (M0_1) | 0 | 0.0384 | — | 0 | 0.0810 | — |
| focal length | 24.809 | −21.503 | 489.233 | 24.809 | −42.450 | 47.790 |

Assuming that the refractive powers in the sub-scanning section of the first fθ lenses 106 and 206 are Ps1 and Ps2, respectively, the optical scanning apparatus 2 of this embodiment brings about |Ps1|=0.0020 and |Ps2|=0.0209 as shown in Table 7.

Meanwhile, as shown in Table 7, in both of the first fθ lenses 106 and 206 included in the optical scanning apparatus 2 of this embodiment, each of the incident surfaces has a positive refractive power in the sub-scanning section while each of the exit surfaces has a negative refractive power in the sub-scanning section. Moreover, both of the first fθ lenses 106 and 206 have a positive power in the sub-scanning section as the whole systems.

As described above, the positive refractive power Ps2 in the sub-scanning section of the first fθ lens 206 is larger than the positive refractive power Ps1 in the sub-scanning section of the first fθ lens 106.

Accordingly, in order to set an amount of separation of the light fluxes (in other words, an interval therebetween) exiting from the first fθ lens 106 substantially equal to an amount of separation of the light fluxes exiting from the first fθ lens 206, it is only necessary to set an amount Ts2 of sagittal tilt on each of the exit surfaces 2061 and 2062 (a value $M_{01}$ of each of the exit surfaces 2061 and 2062) of the first and second optical portions 206a and 206b of the first fθ lens 206 larger than an amount Ts1 of sagittal tilt on each of the exit surfaces 1061 and 1062 (a value $M_{01}$ of each of the exit surfaces 1061 and 1062) of the first and second optical portions 106a and 106b of the first fθ lens 106.

To be more precise, in the optical scanning apparatus 2 of this embodiment, the absolute value $|M_{01}|$ of the amount of sagittal tilt on each of the exit surfaces 1061 and 1062 of the first and second optical portions 106a and 106b of the first fθ lens 106 is set to 0.0384. Meanwhile, the absolute value $|M_{01}|$ of the amount of sagittal tilt on each of the exit surfaces 2061 and 2062 of the first and second optical portions 206a and 206b of the first fθ lens 206 is set to 0.0810.

Hence, the optical scanning apparatus 2 of this embodiment is configured to satisfy conditions defined as |Ps1|≤|Ps2| and |Ts1|≤|Ts2|.

As described above, the optical scanning apparatus 2 of this embodiment can reduce the amounts of curve of the scanning lines by using the above-described first fθ lenses 106 and 206, and thus to provide the optical scanning apparatus that achieves further reduction in size.

In addition, the optical scanning apparatus 2 can suppress an interference between optical members by adjusting the amount of light beam separation while maintaining optical performances concerning the sub-scanning magnification, generation of the ghost light, and the like.

While the preferred embodiments of the present invention have been described above, it is to be understood that the invention is not limited only to these embodiments but various modifications and changes are possible within the scope of the invention.

[Image Forming Apparatus]

Figure 11:
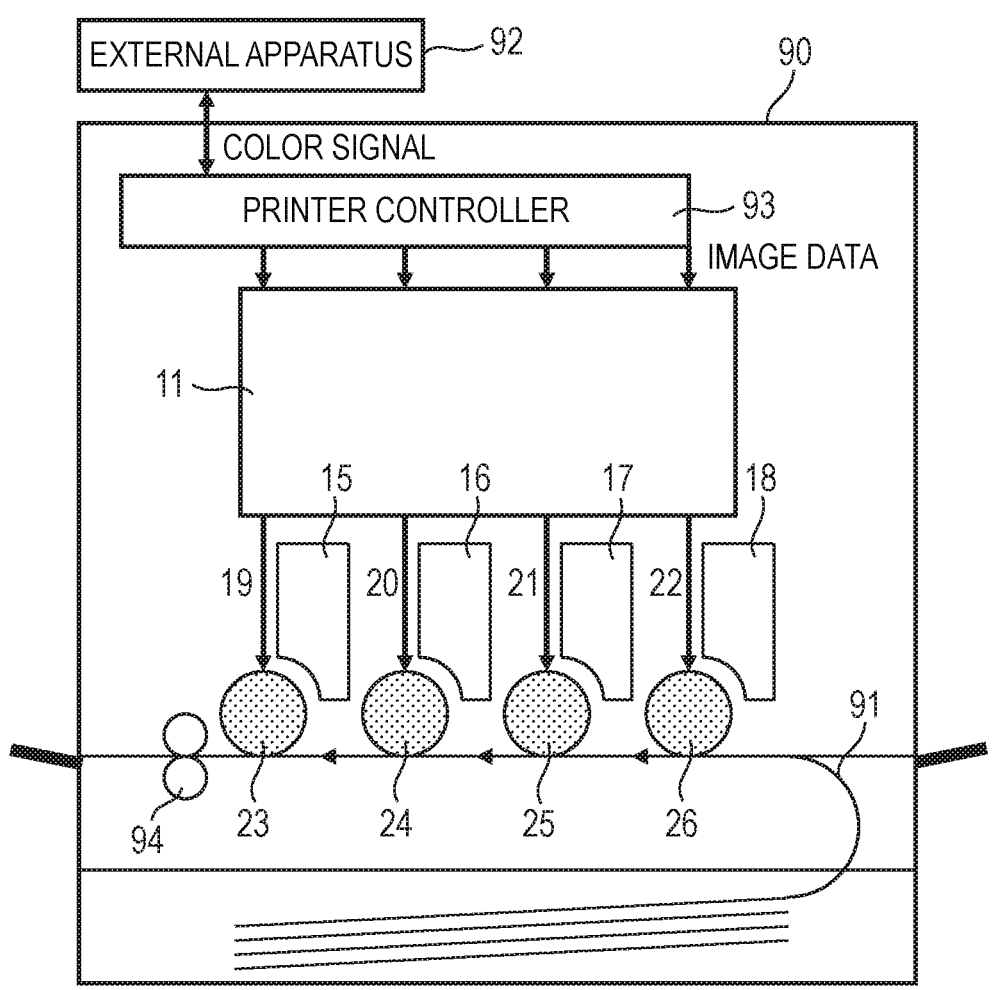
FIG. 11 is a sub-scanning sectional view showing a substantial part of a color image forming apparatus according to an embodiment.

FIG. 11 shows a sub-scanning sectional view of a substantial part of a color image forming apparatus 90 that mounts an optical scanning apparatus 11 according to the second embodiment.

The image forming apparatus 90 is a color image forming apparatus of a tandem type, which includes the optical scanning apparatus 11 according to the second embodiment and is configured to record image information on respective photosensitive drums that serve as image carriers.

The image forming apparatus 90 includes the optical scanning apparatus 11 according to the second embodiment, photosensitive drums (photosensitive bodies) 23, 24, 25, and 26 serving as the image carriers, and developing units 15, 16, 17, and 18. Moreover, the image forming apparatus 90 includes a conveyance belt 91, a printer controller 93, and a fixing unit 94.

Signals (code data) of respective colors of R (red), G (green), and B (blue) outputted from an external apparatus 92 such as a personal computer are inputted to the image forming apparatus 90. The inputted color signals are converted into respective image data (dot data) of C (cyan), M (magenta), Y (yellow), and K (black) by the printer controller 93 in the image forming apparatus 90.

The converted image data are inputted to the optical scanning apparatus 11, respectively. Then, light beams 19, 20, 21, and 22 modulated in accordance with the respective image data are emitted from the optical scanning apparatus 11, respectively, and photosensitive surfaces of the photosensitive drums 23, 24, 25, and 26 are exposed to these light beams.

Charging rollers (not shown) configured to uniformly charge surfaces of the photosensitive drums 23, 24, 25, and 26 are provided in contact with the respective surfaces thereof. Moreover, the optical scanning apparatus 11 irradiates the surfaces of the photosensitive drums 23, 24, 25, and 26, which are charged by the charging rollers, with the light beams 19, 20, 21, and 22.

As mentioned above, the light beams 19, 20, 21, and 22 are modulated in accordance with the image data of the respective colors, and electrostatic latent images are formed on the surfaces of the photosensitive drums 23, 24, 25, and 26 as a consequence of irradiation with the light beams 19, 20, 21, and 22. The electrostatic latent images thus formed are developed into toner images by the developing units 15, 16, 17, and 18 which are arranged in contact with the photosensitive drums 23, 24, 25, and 26.

The toner images developed by the developing units 15 to 18 are subjected to multiple transfer by means of not-illustrated transferring rollers (transferring units) arranged face-to-face to the photosensitive drums 23 to 26 onto a not-illustrated sheet (a transferred material) that is conveyed on the conveyance belt 91, whereby a single full-color image is formed thereon.

The sheet to which the unfixed toner images are transferred as described above is further conveyed to the fixing unit 94 located downstream of the photosensitive drums 23, 24, 25, and 26 (on the left side in FIG. 11). The fixing unit 94 includes a fixing roller having a built-in fixing heater (not shown), and a pressure roller arranged in pressure-contact with this fixing roller. The sheet conveyed from the transferring units is pressed and heated by pressure-contact parts of the fixing roller and the pressure roller, whereby the unfixed toner images on the sheet are fixed. Moreover, a not-illustrated sheet discharging roller is arranged behind the fixing roller. The sheet discharging roller discharges the fixed sheet outside the image forming apparatus 90.

The color image forming apparatus 90 is configured to record image signals (image information) on the photosensitive surfaces of the photosensitive drums 23, 24, 25, and 26 that correspond to the respective colors of C, M, Y, and K by using the optical scanning apparatus 11, thereby printing a color image at a high speed.

A color image reading apparatus provided with a CCD sensor may be used as the external apparatus 92, for example. In this case, the color image reading apparatus and the color image forming apparatus 90 collectively constitute a color digital copier.

In the meantime, a pair of the optical scanning apparatuses according to the first embodiment may be used instead of the optical scanning apparatus 11 of the second embodiment.

According to the present invention, it is possible to provide an optical scanning apparatus which is capable of achieving further reduction in size by reducing amount of curve of scanning lines in a sub-scanning direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-154096, filed Aug. 20, 2018, which is hereby incorporated by reference herein in its entirety.

What is claimed is:

1. An optical scanning apparatus comprising:
    a deflecting unit configured to scan first and second scanned surfaces in a main scanning direction by deflecting first and second light fluxes incident on a first deflecting surface at different angles with respect to a main scanning section in a sub-scanning section; and
    a first optical element including first and second optical portions which are configured to guide the first and second light fluxes deflected by the deflecting unit to the first and second scanned surfaces, respectively, wherein
    an incident surface of the first optical element projects most toward the deflecting unit at a position of a surface vertex on the incident surface in a sub-scanning section including the surface vertex,
    at least one of a first exit surface of the first optical portion and a second exit surface of the second optical portion is a sagittal tilt surface, and
    a distance between a surface vertex on the first exit surface and a surface vertex on the second exit surface in a sub-scanning section including an incident position of an axial ray is larger than a distance between a surface vertex on the first exit surface and a surface vertex on the second exit surface in a sub-scanning section including an incident position of an outermost off-axis ray.

2. The optical scanning apparatus according to claim 1, wherein at least one of an incident surface of the first optical portion and an incident surface of the second optical portion is a sagittal tilt surface.

3. The optical scanning apparatus according to claim 1, wherein the surface vertex on the first exit surface in the sub-scanning section including the incident position of the axial ray is located on an opposite side of the first optical portion with respect to a main scanning section including the surface vertex on the incident surface of the first optical element.

4. The optical scanning apparatus according to claim 1, further comprising:
a second optical element including third and fourth optical portions which are configured to guide third and fourth light fluxes deflected by the deflecting unit to third and fourth scanned surfaces, respectively, wherein
the deflecting unit scans the third and fourth scanned surfaces in the main scanning direction by deflecting the third and fourth light fluxes incident on a second deflecting surface at different angles with respect to a main scanning section in a sub-scanning section,
at least one of a third exit surface of the third optical portion and a fourth exit surface of the fourth optical portion is a sagittal tilt surface, and
shapes of the first and second optical elements are different from each other.

5. The optical scanning apparatus according to claim 4, wherein an incident surface of the second optical element projects most toward the deflecting unit at a position of a surface vertex on the incident surface in a sub-scanning section including the surface vertex.

6. The optical scanning apparatus according to claim 4, wherein a distance between an axial deflection point on the first deflecting surface and an incident surface of the first optical element is equal to a distance between an axial deflection point on the second deflecting surface and an incident surface of the second optical element.

7. The optical scanning apparatus according to claim 4, wherein a distance between a surface vertex on the third exit surface and a surface vertex on the fourth exit surface in a sub-scanning section including an incident position of an axial ray is larger than a distance between a surface vertex on the third exit surface and a surface vertex on the fourth exit surface in a sub-scanning section including an incident position of an outermost off-axis ray.

8. The optical scanning apparatus according to claim 4, wherein following conditions are satisfied:

$$|Ps1| \leq |Ps3|, \text{ and}$$

$$|Ts1| \leq |Ts3|,$$

where Ps1 and Ts1 represent a refractive power in a sub-scanning section and an amount of sagittal tilt on the first exit surface, of the first optical portion, respectively, and Ps3 and Ts3 represent a refractive power in a sub-scanning section and an amount of sagittal tilt on the third exit surface, of the third optical portion, respectively.

9. The optical scanning apparatus according to claim 1, wherein an incident surface of the first optical element has a positive refractive power.

10. The optical scanning apparatus according to claim 1, wherein an exit surface of the first optical element has a negative refractive power.

11. The optical scanning apparatus according to claim 1, wherein the first optical element has a positive refractive power.

12. An image forming apparatus comprising:
the optical scanning apparatus according to claim 1;
a developing unit configured to develop electrostatic latent images formed on the scanned surfaces with the optical scanning apparatus into toner images;
a transferring unit configured to transfer the developed toner images to a transferred material; and
a fixing unit configured to fix the transferred toner images to the transferred material.

13. An image forming apparatus comprising:
the optical scanning apparatus according to claim 1; and
a printer controller configured to convert a signal outputted from an external apparatus into image data and to input the image data to the optical scanning apparatus.

14. An optical scanning apparatus comprising:
a deflecting unit configured to scan first and second scanned surfaces in a main scanning direction by deflecting first and second light fluxes incident on a first deflecting surface at different angles with respect to a main scanning section in a sub-scanning section, and configured to scan third and fourth scanned surfaces in a main scanning direction by deflecting third and fourth light fluxes incident on a second deflecting surface at different angles with respect to a main scanning section in a sub-scanning section;
a first optical element including first and second optical portions which are configured to guide the first and second light fluxes deflected by the deflecting unit to the first and second scanned surfaces, respectively;
a second optical element including third and fourth optical portions which are configured to guide the third and fourth light fluxes deflected by the deflecting unit to the third and fourth scanned surfaces, respectively, wherein
at least one of a first exit surface of the first optical portion and a second exit surface of the second optical portion is a sagittal tilt surface, and
shapes of the first and second optical elements are different from each other.

15. The optical scanning apparatus according to claim 14, wherein an incident surface of the first optical element projects most toward the deflecting unit at a position of a surface vertex on the incident surface in a sub-scanning section including the surface vertex, and
an incident surface of the second optical element projects most toward the deflecting unit at a position of a surface vertex on the incident surface in a sub-scanning section including the surface vertex.

16. The optical scanning apparatus according to claim 14, wherein a distance between a surface vertex on the first exit surface and a surface vertex on the second exit surface in a sub-scanning section including an incident position of an axial ray is larger than a distance between a surface vertex on the first exit surface and a surface vertex on the second exit surface in a sub-scanning section including an incident position of an outermost off-axis ray, and
a distance between a surface vertex on a third exit surface of the third optical portion and a surface vertex on a fourth exit surface of the fourth optical portion in a sub-scanning section including an incident position of an axial ray is larger than a distance between a surface vertex on the third exit surface and a surface vertex on the fourth exit surface in a sub-scanning section including an incident position of an outermost off-axis ray.

17. An image forming apparatus comprising:
the optical scanning apparatus according to claim 14;
a developing unit configured to develop electrostatic latent images formed on the scanned surfaces with the optical scanning apparatus into toner images;
a transferring unit configured to transfer the developed toner images to a transferred material; and
a fixing unit configured to fix the transferred toner images to the transferred material.

18. An image forming apparatus comprising:
the optical scanning apparatus according to claim 14; and
a printer controller configured to convert a signal outputted from an external apparatus into image data and to input the image data to the optical scanning apparatus.

\* \* \* \* \*